(12) United States Patent
Heo et al.

(10) Patent No.: US 8,923,323 B2
(45) Date of Patent: Dec. 30, 2014

(54) TECHNIQUES FOR TIMERS ASSOCIATED WITH POWERING RECEIVER CIRCUITRY AT A WIRELESS DEVICE

(71) Applicant: Intel Corporation, Santa Clara, CA (US)

(72) Inventors: Youn Hyoung Heo, Seoul (KR); Hong He, Beijing (CN); Jong-Kae Fwu, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/629,682

(22) Filed: Sep. 28, 2012

(65) Prior Publication Data

US 2013/0242818 A1   Sep. 19, 2013

Related U.S. Application Data

(60) Provisional application No. 61/612,188, filed on Mar. 16, 2012.

(51) Int. Cl.
*H04J 3/00*     (2006.01)
*H04W 52/02*   (2009.01)
*H04W 72/04*   (2009.01)
(Continued)

(52) U.S. Cl.
CPC ....... *H04N 21/25841* (2013.01); *H04W 52/143* (2013.01); *H04W 52/0209* (2013.01); *H04W 52/0206* (2013.01); *H04W 72/04* (2013.01); *H04N 21/41407* (2013.01); *H04W 76/048* (2013.01); *H04W 72/0413* (2013.01); *H04W 24/00* (2013.01); *H04W 4/06* (2013.01); *H04N 21/6408* (2013.01); *H04W 72/1205* (2013.01); *H04W 72/0406* (2013.01); *H04W 52/02* (2013.01); *H04W 52/0235* (2013.01); *H04L 5/14* (2013.01); *H04W 72/042* (2013.01); *H04W 24/02* (2013.01); *H04N 21/6405* (2013.01); *Y02B 60/50* (2013.01); *H04W 72/082* (2013.01); *H04W 52/0229* (2013.01)
USPC ......................................................... 370/464

(58) Field of Classification Search
USPC ................................................. 370/464–540
See application file for complete search history.

(56) References Cited

U.S. PATENT DOCUMENTS

2010/0037114 A1   2/2010   Huang et al.
2011/0292851 A1   12/2011  Fong et al.
(Continued)

OTHER PUBLICATIONS

International Search Report and Written Opinion received for PCT Patent Application No. PCT/US2013/032612, mailed Jun. 26, 2013, 11 pages.

(Continued)

*Primary Examiner* — Fan Ng
(74) *Attorney, Agent, or Firm* — Kacvinsky Daisak Bluni PLLC

(57) ABSTRACT

Examples are disclosed for timers associated with powering receiver circuitry at a wireless device or user equipment. The examples include separately defining one or more timers based on different time division duplex (TDD) configurations. The different TDD configurations may be used for communications between user equipment and serving cells supported by one or more base stations such as evolved node Bs (eNBs) in a Long Term Evolution (LTE) wireless network. The defined timers may be used by the user equipment to selectively power receiver circuitry. Other examples are described and claimed.

26 Claims, 18 Drawing Sheets

(51) Int. Cl.

| | | |
|---|---|---|
| *H04N 21/414* | (2011.01) | |
| *H04W 76/04* | (2009.01) | |
| *H04W 24/00* | (2009.01) | |
| *H04W 4/06* | (2009.01) | |
| *H04N 21/6408* | (2011.01) | |
| *H04W 72/12* | (2009.01) | |
| *H04L 5/14* | (2006.01) | |
| *H04W 24/02* | (2009.01) | |
| *H04N 21/258* | (2011.01) | |
| *H04N 21/6405* | (2011.01) | |
| *H04W 72/08* | (2009.01) | |
| *H04W 52/14* | (2009.01) | |

(56) References Cited

U.S. PATENT DOCUMENTS

| | | | |
|---|---|---|---|
| 2012/0155355 A1 | 6/2012 | Kwon et al. | |
| 2012/0188907 A1* | 7/2012 | Dayal et al. | 370/254 |
| 2012/0281600 A1* | 11/2012 | Tseng et al. | 370/280 |
| 2012/0294163 A1* | 11/2012 | Turtinen et al. | 370/252 |
| 2013/0044652 A1* | 2/2013 | Wang et al. | 370/280 |
| 2013/0208641 A1* | 8/2013 | Baghel et al. | 370/311 |
| 2013/0242833 A1* | 9/2013 | Ahn et al. | 370/311 |
| 2013/0301420 A1* | 11/2013 | Zhang et al. | 370/241 |

OTHER PUBLICATIONS

Ericsson et al., "Different TDD configurations in inter-band CA", 3GPP TSG-RAN WG2 #77, R2-120465, Dresden, Germany, Feb. 6-10, 2012, 4 pages.

Asustek et al.,"DRX operation with different TDD UL/DL configurations", 3GPP TSG-RAN2, Meeting#77, R2-120360, Dresden, Germany, Feb. 6-10, 2012, 3 pages.

3GPP TS 36.321 V8.0.0; 3rd Generation Partnership Project; Technical Specification Group Radio Access Network; Evolved Universal Terrestrial Radio Access (E-UTRA) Medium Access Control (MAC) protocol specification (Release 8) Dec. 2007.

* cited by examiner

TDD Configuration Table 300

| Uplink-Downlink Configuration | Downlink-to-Uplink Switch-Point Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

ESTABLISH, AT A BASE STATION ARRANGED TO SUPPORT A FIRST SERVING CELL FOR USER EQUIPMENT, A FIRST TDD ASSOCIATED WITH COMMUNICATIONS TO A WIRELESS DEVICE
1002

RECEIVE TDD CONFIGURATION INFORMATION FOR A SECOND SERVING CELL INDICATING THE SECOND SERVING CELL HAS ESTABLISHED A SECOND TDD CONFIGURATION ASSOCIATED WITH COMMUNICATIONS TO THE USER EQUIPMENT THAT IS DIFFERENT FROM THE FIRST TDD CONFIGURATION
1004

DEFINE ONE OR MORE TIMERS ASSOCIATED WITH TEMPORARILY POWERING ON OR OFF RECEIVER CIRCUITRY AT THE USER EQUIPMENT BASED ON THE FIRST AND SECOND TDD CONFIGURATIONS
1006

DEFINE AN ON DURATION TIMER, AN INACTIVITY TIMER OR A RETRANSMISSION TIMER
1008

TRANSMIT INFORMATION INDICATING DEFINITIONS FOR THE ONE OR MORE TIMERS TO THE USER EQUIPMENT
1010

*FIG. 10*

Storage Medium 1200

Computer Executable Instructions for 1000

Computer Executable Instructions for 1100

- RECEIVE A FIRST SET OF TIMERS ASSOCIATED WITH POWERING RECEIVING CIRCUITRY ARRANGED TO RECEIVE DATA FROM A FIRST SERVING CELL USING A FIRST TDD CONFIGURATION
  1402

- RECEIVE A SECOND SET OF TIMERS ASSOCIATED WITH POWERING RECEIVING CIRCUITRY ARRANGED TO RECEIVE DATA FROM A SECOND SERVING CELL USING A SECOND TDD CONFIGURATION
  1404

- RECEIVE DATA FROM THE FIRST SERVING CELL
  1406
  - SELECTIVELY POWER ON OR OFF THE RECEIVING CIRCUITRY BASED ON THE FIRST SET OF TIMERS
    1408

- RECEIVE DATA FROM THE SECOND SERVING CELL
  1410
  - SELECTIVELY POWERING ON OR OFF THE RECEIVING CIRCUITRY BASED ON THE SECOND SET OF TIMERS
    1412

*FIG. 14*

Storage Medium 1600

*Computer Executable Instructions for 1400*

*Computer Executable Instructions for 1500*

*FIG. 16*

TECHNIQUES FOR TIMERS ASSOCIATED WITH POWERING RECEIVER CIRCUITRY AT A WIRELESS DEVICE

RELATED CASE

This application claims priority to U.S. Provisional Patent Application No. 61/612,188, filed on Mar. 16, 2012, the entirety of which is hereby incorporated by reference.

BACKGROUND

One or more time division duplex (TDD) configurations may be implemented by a plurality of serving cells (cells or carriers equivalently) in a wireless network for communications to wireless devices or user equipment (UE). Implementing a given TDD configuration at a base station may include using a downlink-to-uplink switch-point periodicity associated with a number of subframes for downlink and uplink respectively. In order to increase the peak data rate, carrier aggregation may be implemented in which UEs are served by multiple cells simultaneously. When carrier aggregation is applied in a TDD system, different TDD configurations can be applied for serving cells in each radio frequency band to have more flexibility in TDD operation.

BRIEF DESCRIPTION OF THE DRAWINGS

FIG. 3 illustrates an example time division duplex (TDD) configuration table.

FIG. 10 illustrates an example of a first logic flow.

FIG. 12 illustrates an example of a first storage medium.

FIG. 14 illustrates an example of a third logic flow.

FIG. 16 illustrates an example of a second storage medium.

DETAILED DESCRIPTION

Figure 1:
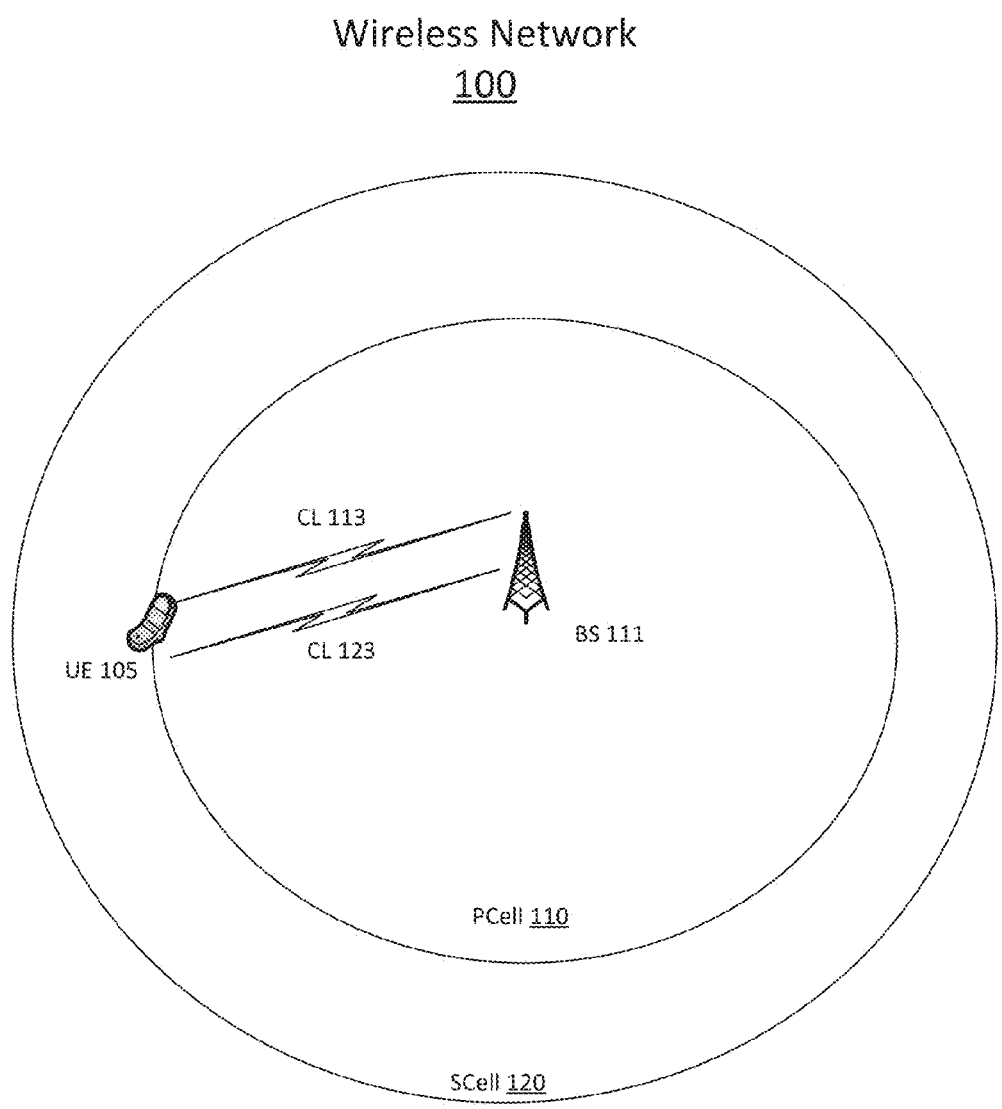
FIG. 1 illustrates an example wireless network.

Examples are generally directed to improvements for wireless wide area networks (WWANs) using wireless mobile telecommunication cellular or wireless mobile broadband technologies. Wireless mobile broadband technologies may include any wireless technologies suitable for use with wireless devices or user equipment (UE), such as one or more third generation (3G) or fourth generation (4G) wireless standards, revisions, progeny and variants. Examples of wireless mobile broadband technologies may include without limitation any of the Institute of Electrical and Electronics Engineers (IEEE) 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1xRTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8, 9 or 10 of LTE/System Architecture Evolution (SAE), and so forth. The examples are not limited in this context.

By way of example and not limitation, various examples may be described with specific reference to various 3GPP LTE and LTE-A standards, such as the 3GPP LTE Evolved UMTS Terrestrial Radio Access Network (E-UTRAN), Universal Terrestrial Radio Access (E-UTRA) and LTE-A Radio Technology 36 Series of Technical Specifications (collectively "3GPP LTE Specifications"), and IEEE 802.16 standards, such as the IEEE 802.16-2009 standard and current third revision to IEEE 802.16 referred to as "802.16Rev3" consolidating standards 802.16-2009, 802.16h-2010 and 802.16m-2011, and the IEEE 802.16p draft standards including IEEE P802.16.1b/D2 Jan. 2012 titled "Draft Amendment to IEEE Standard for WirelessMAN-Advanced Air Interface for Broadband Wireless Access Systems, Enhancements to Support Machine-to-Machine Applications" (collectively "IEEE 802.16 Standards"), and any drafts, revisions or variants of the 3GPP LTE Specifications and the IEEE 802.16 Standards. Although some embodiments may be described as a 3GPP LTE Specifications or IEEE 802.16 Standards system by way of example and not limitation, it may be appreciated that other types of communications system may be implemented as various other types of mobile broadband communications systems and standards. The examples are not limited in this context As contemplated in the present disclosure, different or separate TDD configurations may be used for radio frequency bands to provide more flexible configurations between cells serving a wireless device or UE in carrier aggregation. Use of different TDD configurations may complicate definitions for timers associated with temporarily powering off receiver circuitry to save power at a UE. One group of timers that may be difficult to define is typically used in 3GPP LTE or LTE-A compliant networks. The timers included in this group are known as discontinuous reception (DRX) timers. Definitions for DRX timers are typically based on when downlink subframes are expected from a base station that uses a given TDD configuration to communicate with a UE.

DRX timers may be commonly defined regardless of different TDD configurations being used by a base station and/or serving cells communicating to a given UE. Commonly defined timers for different TDD configurations may result in timers that fail to take into account more or less downlink subframes possibly included in the different TDD configurations. As a result of not taking into account the disparity in the number of downlink subframes, scheduling issues may arise for receiving data at the given UE. Also, fewer opportunities to reduce power consumption may result when basing DRX timer definitions on a given TDD configuration that may have more downlink subframes than other TDD configurations possibly being used. It is with respect to these and other challenges that the examples described herein are needed.

In some examples, techniques are implemented for defining timers associated with powering receiver circuitry at a wireless device or UE. These techniques may include establishing, at a base station (e.g., an eNB) supporting a serving cell for the UE, a first TDD configuration associated with communications to the UE. TDD configuration information may be received for one or more other serving cells. The TDD configuration information may indicate at least one of the one or more other serving cells has established a second TDD configuration associated with communications to the UE that is different from the first TDD configuration. For these examples, one or more timers (e.g., DRX timers) associated with temporarily powering on or off receiver circuitry at the UE may be defined based on the first and second TDD configurations. Information indicating definitions for the one or more timers may then be transmitted to the UE.

According to some examples, techniques may also be implemented for using defined timers associated with powering receiver circuitry at a wireless device or UE. These techniques may include receiving a first set of timers (e.g., DRX timers) associated with powering receiver circuitry arranged to receive data from a first serving cell using a first TDD configuration and receiving a second set of timers associated with powering receiver circuitry arranged to receive data from a second serving cell using a second TDD configuration. For these examples, responsive to receipt of data from the first serving cell, the receiver circuitry may be selectively powered on or off based on the first set of timers. Also, responsive to receipt of data from the second serving cell, the receiver circuitry may be selectively powered on or off based on the second set of timers.

FIG. 1 illustrates an example of a wireless network 100. In some examples, as shown in FIG. 1, wireless network 100 includes primary cell (PCell) 110 and a secondary cell (SCell) 120 operated or supported by a same base station (BS) 111. Also, as shown in FIG. 1, BS 111 can provide two frequency carriers to established separate communication links (CLs) for PCell 110 and SCell 120 to UE 105. These separate CLs are shown in FIG. 1 as CL 113 and CL 123.

In some examples, BS 111 supporting PCell 110 may include logic and/or features arranged to serve UE 105 as a primary cell to configure at least some operating parameters. These operating parameters may include operating parameters for UE 105 to communicatively couple to wireless network 100. The operating parameters may include, but are not limited to, one or more timers associated with temporarily powering on or off receiver circuitry at UE 105. As described more below, the one or more timers may be based on TDD configurations associated with communications to UE 105 (e.g., via CLs 113 or).

According to some examples, BS 111 also supporting SCell 120 may include logic and/or features arranged to communicate with UE 105 using the operating parameters managed through PCell 110. SCell 120 may also establish a TDD configuration associated with communications to UE 105. The TDD configuration established with SCell 120 may be different than the TDD configuration established between UE 105 and PCell 110. As described more below, BS 111 may include logic and/or features to define the one or more timers associated with temporarily powering on or off receiver circuitry at UE 105 while taking into account the different TDD configurations. Powering on or off receiver circuitry may include, but is not limited to, powering off components of UE 105 used to receive communication signals from a serving cell such as PCell 110 or PCell 120, e.g., receiving components of a radio interface.

In some examples, UE 105 may include logic and or features to receive timer information from BS 111 that may include one or more timers such a DRX timers used for temporarily or selectively powering on or off receiver circuitry at UE 105. As mentioned above, definitions for the one or more timers may be based on different TDD configurations established between UE 105 and serving cells PCell 110 and SCell 120.

According to some examples, UE 105 may be any electronic device having wireless capabilities or equipment. For some examples, UE 105 may be implemented in a fixed device. A fixed device generally refers to an electronic device designed to be in a fixed, stationary, permanent or otherwise non-moving position or location that does not vary over time. For instance, a fixed device may be installed with fixtures, attachments and housings to prohibit movement, including wired power lines, transmission lines, and so forth. By way of contrast, a mobile device is designed to be portable enough to be frequently moved between various locations over time. It may be appreciated that although a fixed device is generally stationary, some fixed devices may be disconnected from their current equipment in a first fixed location, moved to a second fixed location, and connected to equipment at the second fixed location.

According to some examples, the logic and/or features at BS 111 may include system equipment, such as network equipment for a communications system or network compliant with one or more 3GPP LTE Specifications (e.g., LTE-A). For example, BS 111 may be implemented as evolved Node B (eNB) base stations for a Wireless LTE or LTE-A network. Although some examples are described with reference to a base station (BS) or eNB, examples may utilize any network equipment for a wireless network. The examples are not limited in this context.

Figure 2:
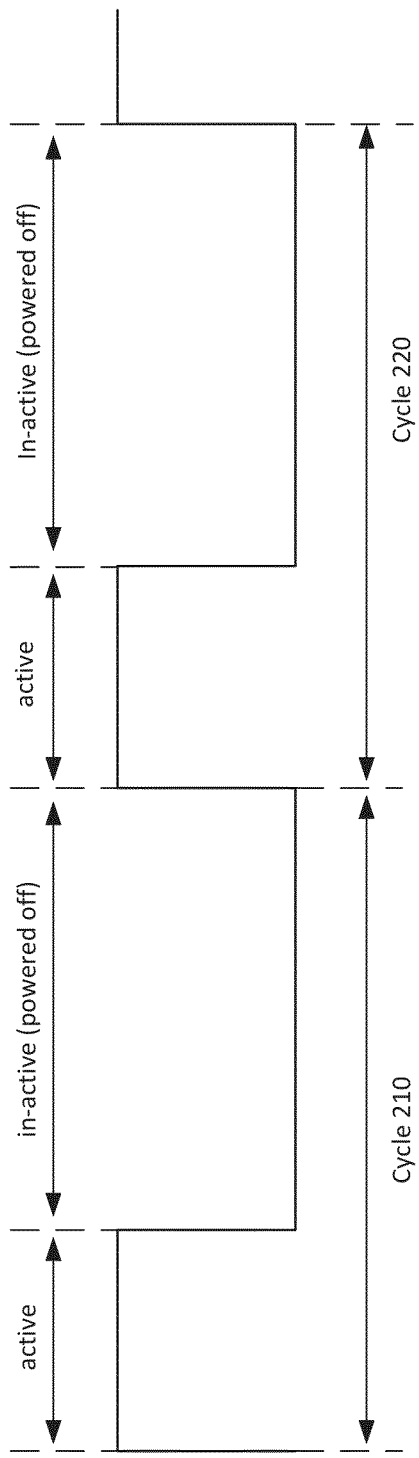
FIG. 2 illustrates an example of discontinuous reception cycles.

FIG. 2 illustrates an example of discontinuous reception cycles 200. As shown in FIG. 2, discontinuous reception cycles 200 include a cycle 210 and a cycle 220. As shown in FIG. 2, cycles 210 and 220 may include active time and in-active time. Active time includes a time while an on duration timer, an inactivity timer or a retransmission timer may be running. In active time, a UE may receive downlink signals such as physical downlink control channel (PDCCH) subframes and may also transmit uplink signals if scheduled according to a given TDD configuration. In inactive time, the UE does not need to receive downlink signals and may power off receiver circuitry to save power.

In some examples, although discontinuous reception cycles 200 may demonstrate whether the UE is active or is powering its receiver circuitry to receive downlink signaling, the UE may also limit uplink transmissions with respect to discontinuous reception cycles 200. For these examples, the UE may not transmit uplink signals if the uplink subframe corresponds to inactive time. The UE may even also power down transmitting circuitry.

In some examples, reception power cycles 200 depict powering of receiver circuitry for cycles 210 and 220. For example, cycle 210 indicates that the receiver circuitry may be powered on for a first portion of cycle 210 (active time) and then is powered off for a second portion of cycle 210 (inactive time). Also, cycle 220 indicates that the receiver circuitry may be powered on for a first portion of cycle 220 and then powered off for a second portion of cycle 220.

According to some examples, discontinuous reception cycles 200 may include cycles similar to DRX cycles associated with power saving techniques implemented by wireless devices or UEs coupled to wireless networks compliant with one or more 3GPP LTE Specifications (e.g., LTE-A). For these examples, the various timers mentioned above may be DRX timers. For example, the on duration timer may be an on DurationTimer, the retransmission timer may be a drx-RetransmissionTimer or the inactivity timer may be a drx-InactivityTimer.

In some examples, on duration, inactivity or retransmission timers may be defined by a base station for a primary cell in a wireless network such as BS 111 for PCell 110 in wireless network 100. These timers may be defined based on a first TDD configuration used by PCell 110 and at least a second TDD configuration used by another serving cell such as SCell 120 to communicate with a wireless device such as UE 105. As described in more detail below, various techniques may be implemented to define and use these timers based on the first and second TDD configurations.

FIG. 3 illustrates an example time division duplex (TDD) configuration table 300. In some examples, as shown in FIG. 3, TDD configuration table 300 may include uplink-downlink configurations 0-6 associated with subframes 0-9. For these examples, TDD configuration table 300 may be arranged according to the 3GPP LTE-A specification. This disclosure is not limited to only TDD configuration tables arranged according to the 3 GPP LTE-A. Other configuration tables are contemplated that may be used to indicate to neighboring base stations what TDD configuration is being implemented to communicate with a wireless device or UE.

According to some examples, as shown in FIG. 3, downlink-to-uplink switch-point periodicities are indicated for each of the TDD configurations. Also, for each of the subframes 0-9 a "D" may indicate expected downlink operations or transmissions from a base station, a "U" may indicate uplink operations or transmissions to a base station and an "S" may indicate special subframes.

In some examples, special subframes may be similar to downlink subframes in relation to defining one or more timers associated with temporarily powering on or off receiver circuitry at a wireless device or UE. The similarity may be based on the UE possibly receiving data from a base station at a special subframe according to the given configuration used by the base station to communicate with the UE. For example, configuration 2 of TDD configuration table 300 indicates special subframes at subframe numbers 1 and 6.

Figure 4:
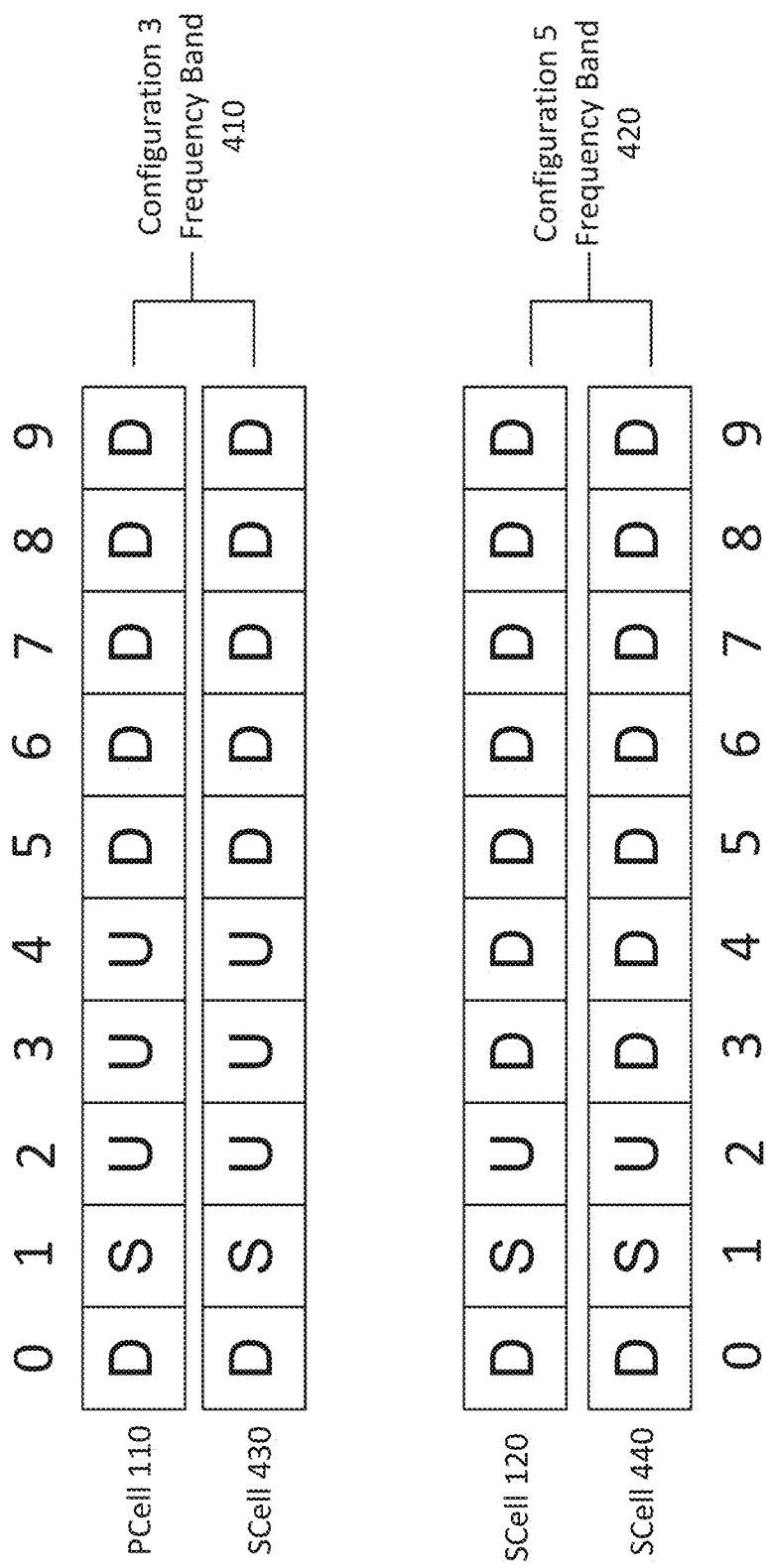
FIG. 4 illustrates a first example TDD diagram.

FIG. 4 illustrates a first example TDD diagram 400. TDD diagram 400 illustrates an example of establishing TDD configurations from TDD table configuration table 300 based on frequency bands. In some examples, as shown in FIG. 4, PCell 110 and another serving cell shown as SCell 430 may have established configuration 3 for communicating with UE 105. Both PCell 110 and SCell 430 may be arranged to communicatively couple to UE 105 via two different frequency carriers located in frequency band 410. Also, as shown in FIG. 4, SCells 120 and another serving cell SCell 440 may have established configuration 5 for communicating with UE 105. Both SCell 120 and SCell 440 may be arranged to communicatively couple to UE 105 via two different frequency carriers located in frequency band 420. Although FIG. 4 shows two frequency bands each including two serving cells having established a given TDD configuration, this disclosure contemplates more than two frequency bands, each frequency band possibly including more than two serving cells.

According to some examples, one or more timers associated with powering on or off receiver circuitry at UE 105 may be defined based on configuration 3 and based on configuration 5. For these examples, separate sets of timers may be defined. A first set of timers may be defined based on configuration 3 and a second set of timers may be defined based on configuration 5. These first and second set of timers may include, but are not limited to, on duration, retransmission or inactivity timers.

In some examples, serving cells grouped according to a given frequency band may be identified as a timing advanced group or "TAG". A TAG may be part of a wireless network compliant with one or more 3GPP LTE Specifications (e.g., LTE-A) and the one or more timers defined according to which TDD configuration is established for each TAG may include DRX timers. For these examples, an eNB for this wireless network may include logic and/or features to determine optimized DRX timer values/definitions based on a number of PDCCH subframes (e.g., indicated by "D" or "S") in the TDD configurations established for a given TAG. For example, according to TDD configuration table 300, configuration 3 includes a total of seven possible PDCCH subframes while configuration 5 includes a total of nine possible PDCCH subframes. Thus, by separately defining DRX timers, the eNB may be able to account for the two PDCCH subframe difference.

According to some examples, the separately defined DRX timers in an LTE-A compliant wireless network may include on DurationTimer and drx-InactivityTimer. Since a drx-RetransmissionTimer may be defined per downlink hybrid automatic repeat request (HARQ) process, a separately defined drx-RetransmissionTimer may not be needed. Also, other types of DRX timers or parameters may apply to all serving cells and their associated base stations. For example, Short DRX Cycle, Long DRX cycle or drxShortCycleTimer may apply to serving cells 110, 120, 430 and 440 in an LTE-A compliant wireless network regardless of what TDD configuration and/or frequency these serving cells may have established to communicate with a UE such as UE 105.

Figure 5:
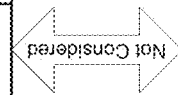
FIG. 5 illustrates a second example TDD diagram.

FIG. 5 illustrates a second example TDD diagram 500. TDD diagram 500 illustrates an example of what subframes may be considered when defining timers associated with powering receiver circuitry at a UE or wireless device. In some examples, two different TDD configurations shown in FIG. 5 as configuration 3 and configuration 5 may be established for communications to the UE or the wireless device. For these examples, the UE may be configured to operate in a half-duplex mode. Also, the UE may be configured to decide a direction for downlink/uplink subframes that may conflict or may be different between the two configurations.

According to some examples, the UE configured to operate in the half-duplex mode may allow either downlink or uplink operations for downlink/uplink subframes that conflict or are different. Also, when the downlink subframes match, downlink operations will be allowed. For example, in an LTE-A compliant wireless network, if downlink operations are allowed when the downlink/uplink subframes are different, the UE may receive downlink subframes to include PDCCH subframes during these conflicting subframes.

In some examples, one or more timers associated with powering receiver circuitry at the UE may be defined such that the one or more timers may be started at any of the subframes of configurations 3 and 5 except subframe 2. For these examples, as shown in FIG. 5, subframe 2 is the only downlink/uplink subframe that is not either a match or in conflict. Put another way, the one or more timers may be started based both on downlink/uplink subframes matching between configurations 3 and 5 and on downlink/uplink subframes being different between configurations 3 and 5 for a given subframe. Hence, in an LTE-A compliant wireless network, the one or more timers may be defined such that these one or more timers may be started or counted upon receipt of a PDCCH at any one of subframes 0, 1 and 3-9.

Figure 6:
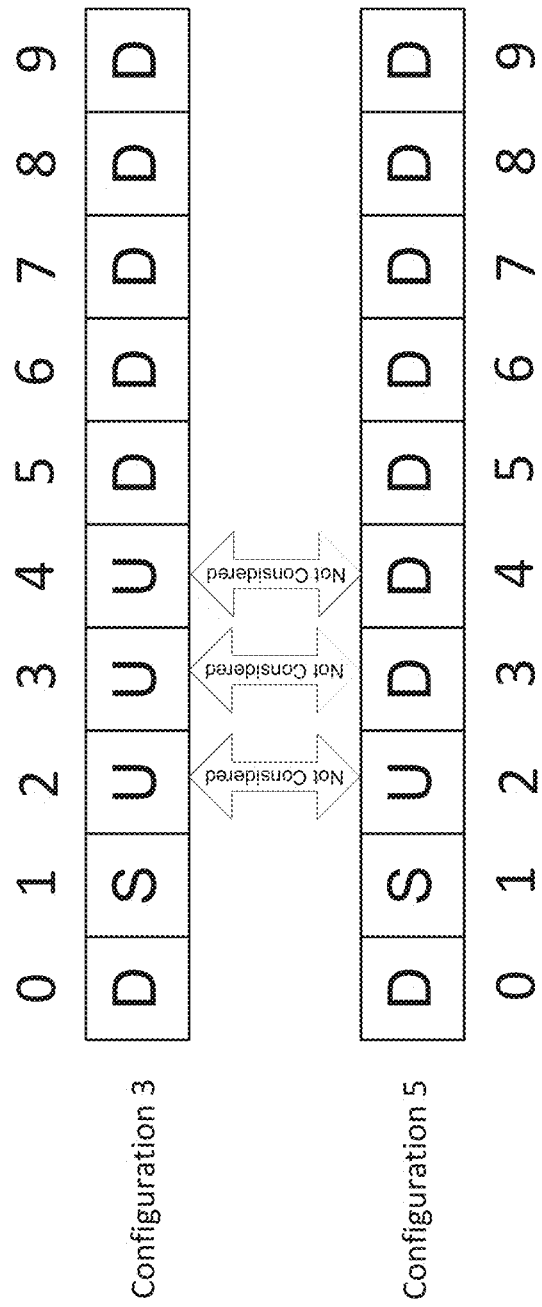
FIG. 6 illustrates a third example TDD diagram.

FIG. 6 illustrates a third example TDD diagram 600. TDD diagram 600 illustrates a different example of what subframes may be considered when defining timers associated with powering receiver circuitry at a UE or wireless device. In some examples, the same two configurations as mentioned above for FIG. 5 may be established for communications to the UE. Also for these examples, the UE may be configured to operate in the half-duplex mode.

According to some examples, the UE configured to operate in the half-duplex mode may allow only uplink operations where downlink/uplink subframes are different or in conflict. For example, in an LTE-A compliant wireless network, if only uplink operations are allowed and the downlink/uplink subframes are different or in conflict, the UE may not receive downlink subframes to include PDCCH subframes during conflicting subframes. In FIG. 6, these conflicting subframes between configurations 3 and 5 are shown as subframes 2, 3 and 4.

In some examples, one or more timers associated with powering receiver circuitry at the UE may be defined such that the one or more timers may be started based on downlink subframes matching between configurations 3 and 5 for a given subframe. As mentioned previously, special subframes may also be considered as downlink subframes for purposes of defining timers. Hence, in an LTE-A compliant wireless network, the one or more timers may be defined such that these one or more timers may be started or counted upon receipt of a PDCCH at any one of subframes 0, 1 or 5-9.

According to some examples, the UE configured to operate in the half-duplex mode may dynamically allow either uplink operations at conflicting subframes or downlink operations at conflicting subframes. For these examples, the one or more timers associated with powering receiver circuitry at the UE may be defined such that the one or more timers may be started based on downlink subframes matching between configurations 3 and 5 for a given subframe. Hence, in an LTE-A compliant wireless network, the one or more timers may be defined in this dynamic allowance example such that these one or more timers may be started upon receipt of a PDCCH at any one of subframes 0, 1 or 5-9.

In some examples, not dependent of whether a UE or wireless device is configured to operate in a half-duplex mode, one or more timers associated with powering receiver circuitry at the UE may be defined such that the one or more timers may be started based both on downlink/uplink subframes matching or conflicting between TDD configurations 3 and 5. In other examples, the one or more timers may also be defined such that the one or more timers may be started based only on downlink/uplink subframes that match between TDD configuration 3 and 5.

Figure 7:
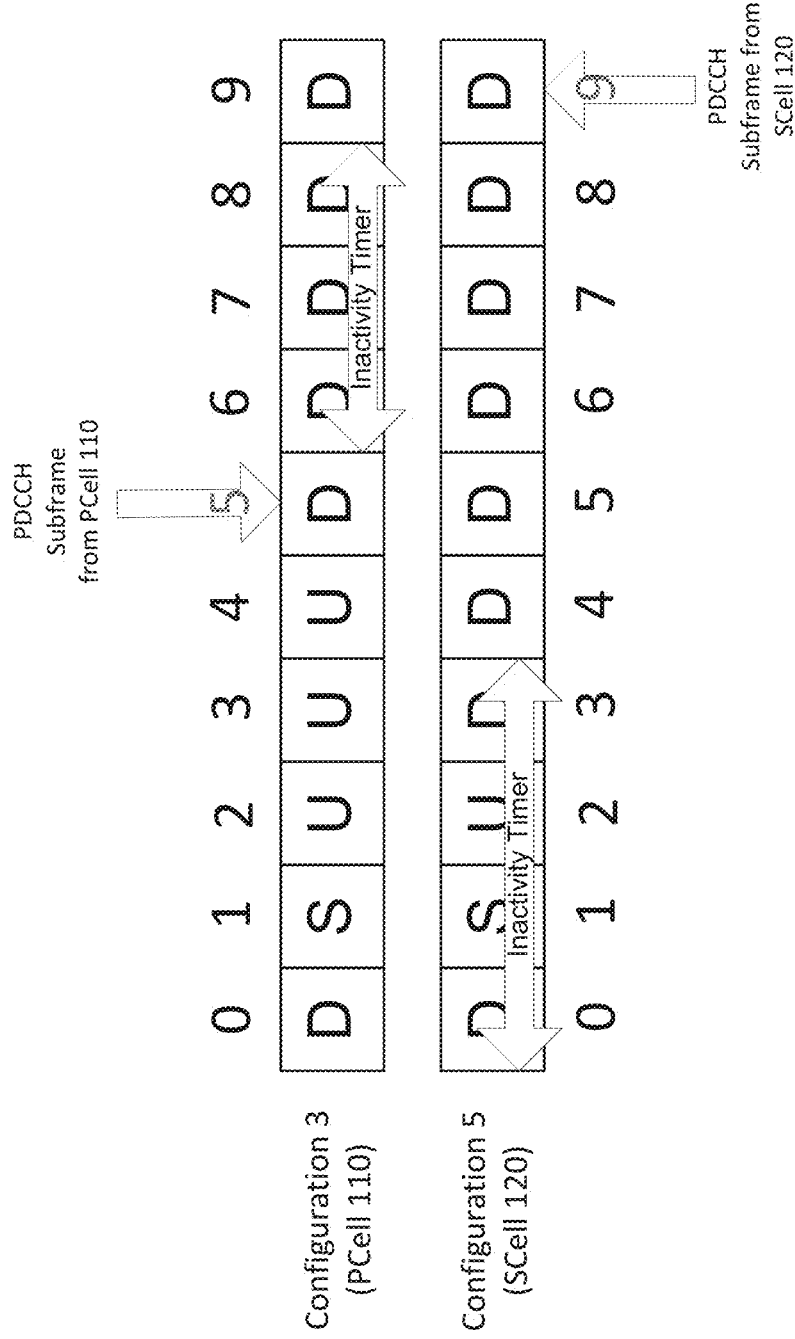
FIG. 7 illustrates a fourth example TDD diagram.

FIG. 7 illustrates a fourth example TDD diagram 700. TDD diagram 700 illustrates an example of an inactivity timer being defined based on a type of downlink subframe received at a UE or wireless device. In some examples, for an LTE-A compliant wireless network such as wireless network 100, the type of downlink subframe may include PDCCH subframes received from scheduling base stations.

According to some examples, as shown in FIG. 7, TDD configuration 3 may have been established for PCell 110 for communications to UE 105. Also TDD configuration 5 may have been established for SCell 120 for communications to UE 105. For these examples, when a PDDCH subframe is received at UE 105 from a scheduling serving cell such as PCell 110, an inactivity timer may be defined such that receiver circuitry at UE 105 may be powered off for the next three downlink subframes. As shown in FIG. 7, the next three subframes are subframes 6-8 for configuration 3. As a result of starting the inactivity timer based on the PDDCH subframe received from PCell 110 only the three downlink subframes of configuration 3 are used to count an amount of time the inactivity timer runs before expiring. For this example, the active time in PCell 110 with the inactivity timer running may be 3 milliseconds (ms).

Also, as shown in FIG. 7, when a PDDCH subframe is received at UE 105 from a scheduling serving cell such as SCell 120, inactivity timer should be started and running for the next three downlink subframes. However, as shown in FIG. 7, a total of four subframes to include subframes 0-3 may be included when inactivity timer is running because uplink subframe, subframe 2 is not counted. For this example, the active time in SCell with the inactivity timer is 3 ms.

Although not shown, a retransmission timer may also be defined based on the type of downlink subframe received at the UE being from a scheduling serving cell. For these examples, the receiver circuitry at the UE may remain powered on for a defined period associated with the retransmission timer. The defined period may be based a given number of downlink subframes. In some examples, the retransmission timer may be started or counted responsive to initiation of a HARQ process.

Figure 8:
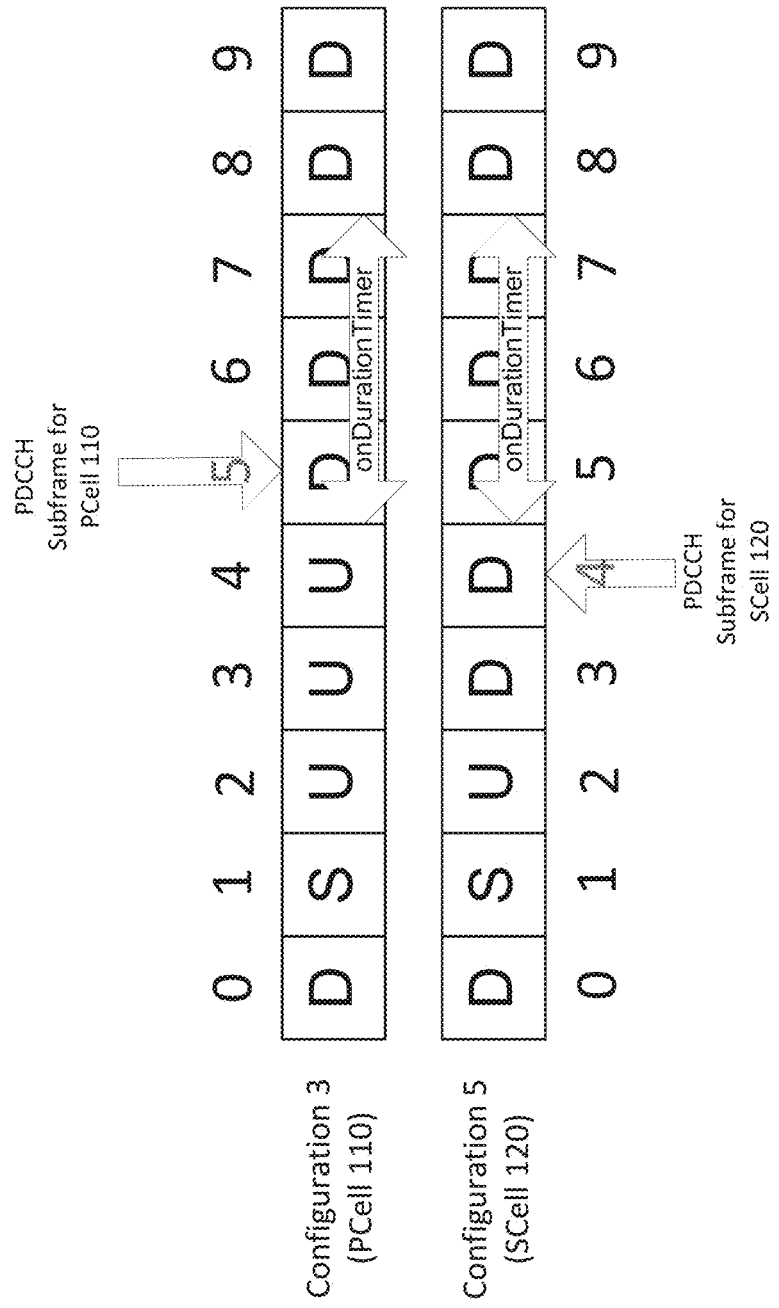
FIG. 8 illustrates a fifth example TDD diagram.

FIG. 8 illustrates a fifth example TDD diagram 800. TDD diagram 800 illustrates an example of an on duration timer being defined based on a PDCCH subframe for a primary cell. In some examples, for an LTE-A compliant wireless network such as wireless network 100, configuration 3 is used for PCell 110. For these examples, although separate TDD configurations have been established with PCell 110 and SCell 120, the initiation or starting of the on DurationTimer occurs based on the primary cell, PCell 110. For example, although on DurationTimer is supposed to start at subframe 4 according to DRX configuration, on DurationTimer is counted from subframe 5 because subframe 4 is not a PDCCH subframe in for PCell 110.

Figure 9:
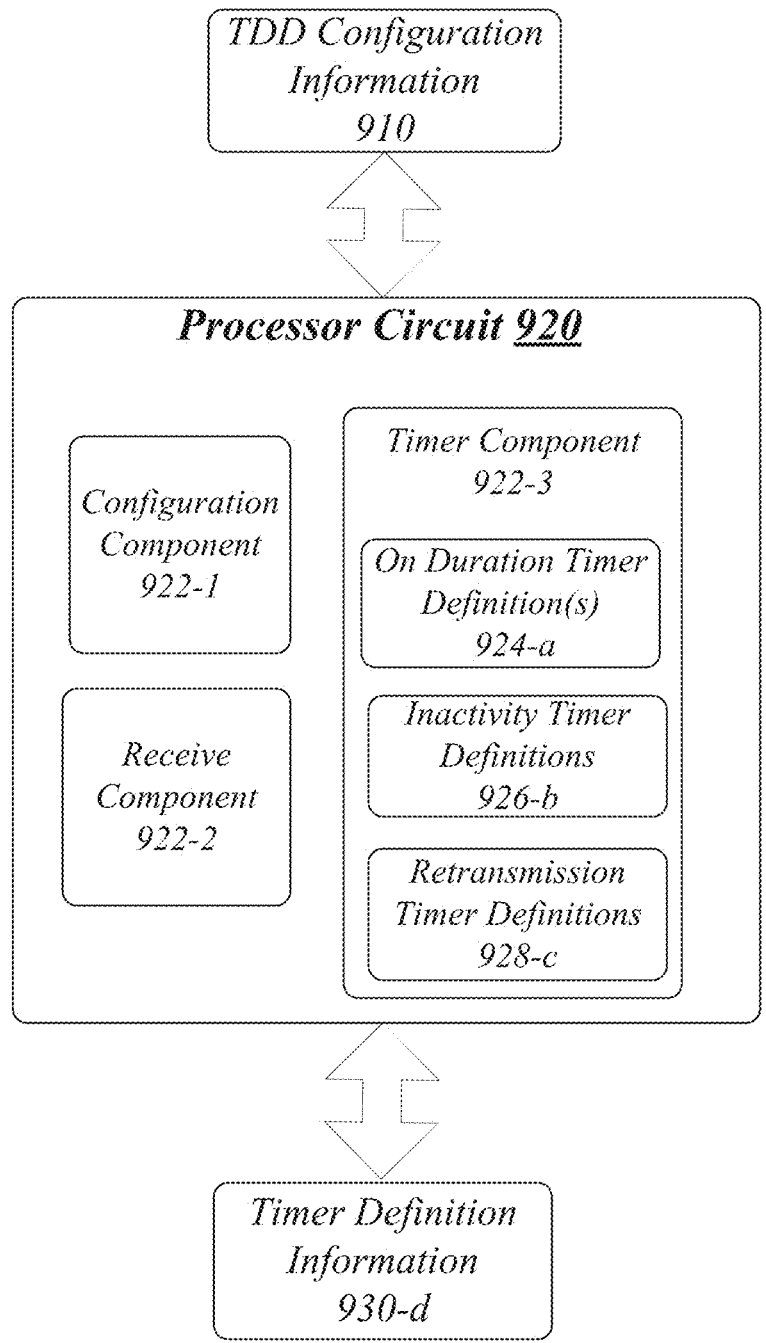
FIG. 9 illustrates an example block diagram for a first apparatus.

FIG. 9 illustrates a block diagram for a first apparatus. As shown in FIG. 9, the first apparatus includes an apparatus 900. Although apparatus 900 shown in FIG. 9 has a limited number of elements in a certain topology or configuration, it may be appreciated that apparatus 900 may include more or less elements in alternate configurations as desired for a given implementation.

The apparatus 900 may comprise a computer-implemented apparatus 900 having a processor circuit 920 arranged to execute one or more software components 922-$a$. It is worthy to note that "a" and "b" and "c" and similar designators as used herein are intended to be variables representing any positive integer. Thus, for example, if an implementation sets a value for a=5, then a complete set of software components 922-$a$ may include components 922-1, 922-2, 922-3, 922-4 and 922-5. The embodiments are not limited in this context.

According to some examples, apparatus 900 may be part of system equipment (e.g., located at or with BS 111), such as network equipment for a communications system or network compliant with one or more 3GPP LTE Specifications. For example, apparatus 900 may be implemented as part of a base station or eNB for an LTE and/or LTE-A compliant wireless network.

In some examples, as shown in FIG. 9, apparatus 900 includes processor circuit 920. Processor circuit 920 may be generally arranged to execute one or more software components 922-a. The processor circuit 920 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Core i3, Core i5, Core i7, Itanium®, Pentium®, Xeon®, and XScale® processors; and similar processors. Dual microprocessors, multi-core processors, and other multi-processor architectures may also be employed as processor circuit 920.

According to some examples, apparatus 900 may include a configuration component 922-1. Configuration component 922-1 may be arranged for execution by processor circuit 920 to establish a first TDD configuration for communicatively coupling to a wireless device or UE. For example, configuration component 922-1 may establish one of the seven TDD configurations shown in TDD configuration table 300 of FIG. 3.

In some examples, apparatus 900 may also include a receive component 922-2. Receive component 922-2 may be arranged for execution by processor circuit 920 to receive TDD configuration information 910 for one or more other serving cells. At least one of the one or more other serving cells may be a secondary serving cell for the wireless device or UE. Configuration information 910 may indicate that the secondary serving cell has established a second TDD configuration for communicatively coupling to the wireless device or UE. According to some examples, the second TDD configuration may also be from one of the seven TDD configurations shown in TDD configuration table 300. However, for this example, the second TDD configuration from TDD configuration table 300 established by the secondary serving cell is different that the first TDD configuration established by configuration component 922-1.

In some examples, apparatus 900 may also include a timer component 922-3. Timer component 922-3 may be arranged for execution by processor circuit 920 to define one or more timers associated with temporarily powering on or off receiver circuitry at the wireless device or UE based on the first and second TDD configurations. For these examples, definitions for the one or more timers may be at least temporarily maintained by timer component 922-3 (e.g., stored in a data structure such as a lookup table (LUT) or in a dedicated portion of persistent memory). The definitions may include on duration timer definitions(s) 924-a, inactivity timer definitions 926-b or retransmission timer definitions 928-c.

According to some examples, a radio interface (not shown in FIG. 9) may be coupled to processor circuit 920. The radio interface may be used to communicate timer definition information 930-d to the wireless device or UE communicatively coupled to a base station that includes apparatus 900 (e.g., BS 111 of wireless network 100). For these examples, timer definition information 930-d may include definitions for on duration, inactivity or retransmission timers that may have been defined by timer component 922-3 as mentioned above.

Various components of apparatus 900 and a device implementing apparatus 900 may be communicatively coupled to each other by various types of communications media to coordinate operations. The coordination may involve the unidirectional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 10 illustrates an example of a first logic flow. As shown in FIG. 10, the first logic flow includes a logic flow 1000. Logic flow 1000 may be representative of some or all of the operations executed by one or more logic, features, or devices described herein, such as apparatus 900. More particularly, logic flow 1000 may be implemented by configuration component 922-1, receive component 922-2 or timer component 922-3.

In the illustrated example shown in FIG. 10, logic flow 1000 may establish, at a base station arranged to support a first serving cell for a UE, a first TDD configuration associated with communications to the UE. According to some examples, configuration component 922-1 may establish the first TDD configuration with a UE such as UE 105 to establish communications via CL 113 with PCell 110 in wireless network 100. For these examples, the first TDD configuration may include TDD configuration 3 as depicted in FIGS. 3-8.

According to some examples, logic flow 1000 at block 1004 may receive TDD configuration information for a second serving cell. The TDD configuration may indicate that the second serving cell has established a second TDD configuration associated with communications to the UE that is different than the first TDD configuration. For example, receive component 922-2 may receive TDD configuration information 910 for SCell 120. TDD configuration information 910 may indicate that SCell 120 has established configuration 5 with UE 105 for communications via CL 123. As shown in FIGS. 3-8, configuration 5 is a different TDD configuration from configuration 3.

According to some examples, logic flow 1000 at block 1006 may define one or more timers associated with temporarily or selectively powering on or off receiver circuitry at the UE based on the first and the second TDD configurations. Logic flow 1000 may also define the one or more times at block 1008 as an on duration timer, an inactivity timer or a retransmission timer. In some examples, timer component 922-3 may define the one or more timers based on configurations 3 and 5. As mentioned above for FIGS. 4-8, according to some examples, the one or more timers may be defined based on different frequencies, matching or different downlink/uplink subframes, mode of operation for a wireless device (e.g., half-duplex) or type of downlink subframe received at the UE.

In some examples, logic flow 1000 at block 1010 may transmit information indicating definitions for the one or more timers to the UE. For example, timer component 922-3 may cause timer definition information 930-d to be transmitted to UE 105.

Figure 11:
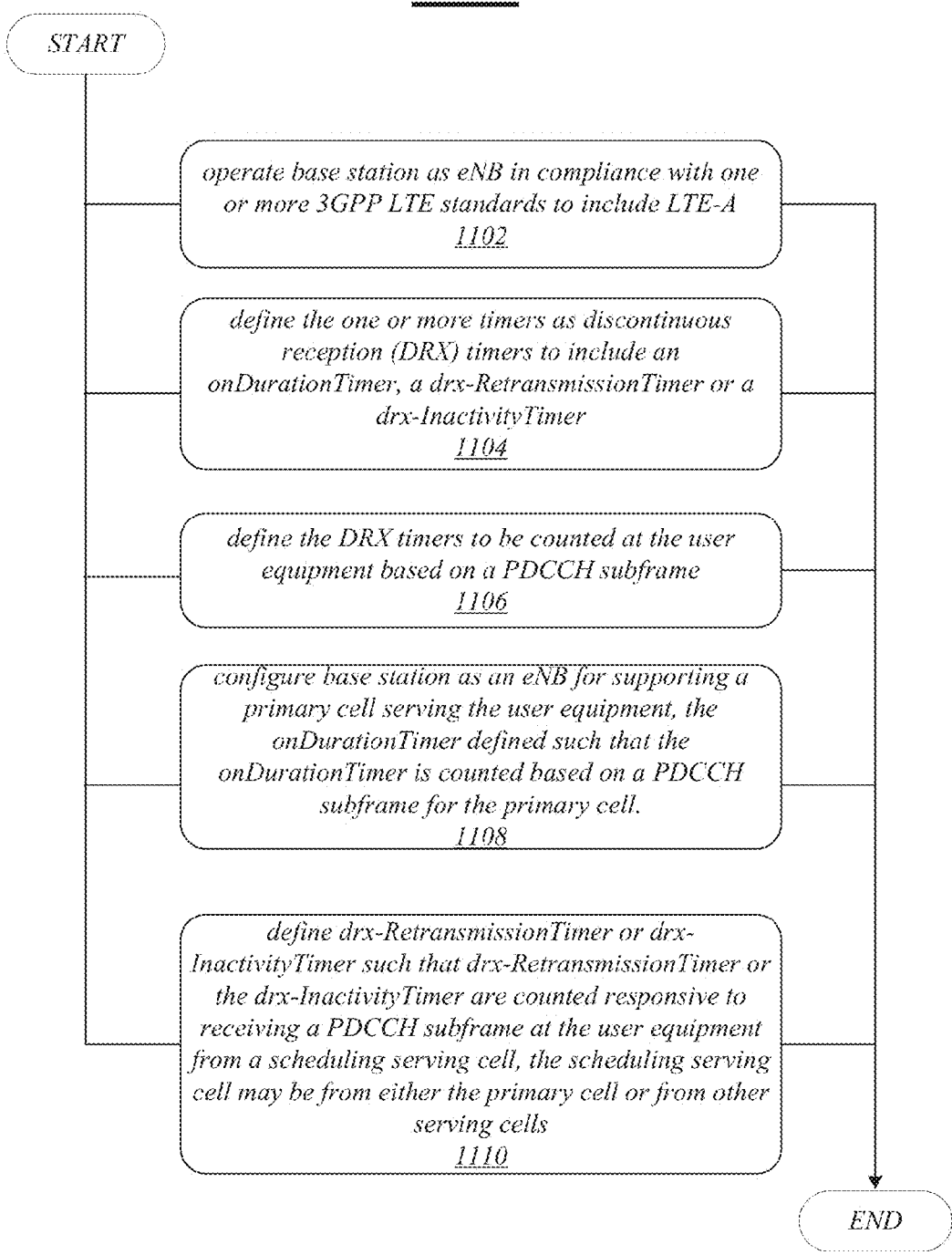
FIG. 11 illustrates an example of a second logic flow.

FIG. 11 illustrates an example of a second logic flow. As shown in FIG. 11, the second logic flow includes a logic flow 1100. The logic flow 1100 may be representative of some or all of the operations executed by one or more logic, features, or devices described herein, such as the apparatus 900. More particularly, the logic flow 1100 may be implemented by configuration component 922-1, receive component 922-2 or timer component 922-3.

In the illustrated example shown in FIG. 11, logic flow 1100 may operate a base station as an eNB in compliance with one or more 3GPP LTE standards or specifications to include specifications associated with LTE-A at block 1102. For example, BS 110 of wireless network 100 may be arranged to operate in compliance with one or more specifications associated with LTE-A. BS 111 may also function as a primary serving cell such as PCell 110 of wireless network 100.

According to some examples, logic flow 1100 may define one or more timers for at temporarily powering on or off receiver circuitry at a UE that may include DRX timers at block 1104. For these examples, the DRX timers may include an on DurationTimer, a drx-RetransmissionTimer or a drx-InactivityTimer.

In some examples, logic flow 1100 may define the DRX timers to be counted at the UE based on a PDDCH subframe at block 1106. For example, an on DurationTimer, a drx-RetransmissionTimer or a drx-InactivityTimer may be started based on a PDDCH subframe associated with TDD configurations established for PCell 110 or SCell 120.

According to some examples, logic flow 1100 may configure a base station as an eNB for supporting a primary cell serving the UE at block 1108. For these examples, the on DurationTimer may be defined such that the on DurationTimer is counted based on a PDCCH subframe for the primary cell. For example, as mentioned above for FIG. 7, BS 111 may be configured to support PCell 110 for serving UE 105 and a PDCCH subframe associated with a TDD configuration for PCell 110 triggers the on DurationTimer.

In some examples, logic flow 1100 at block 1110 may also define drx-RetransmissionTimer or drx-InactivityTimer such that the drx-RetransmissionTimer or the drx-InactivityTimer are counted responsive to receiving a PDCCH subframe at the UE from a scheduling serving cell. The scheduling serving cell may be from either the primary serving cell or from other serving cells. For example, responsive to receipt of a PDCCH subframe for PCell 110 or SCell 120 that are scheduling the exchange of data with UE 105, these DRX timers may be started. Logic flow 1100 may then come to an end.

FIG. 12 illustrates an embodiment of a first storage medium. As shown in FIG. 12, the first storage medium includes a storage medium 1200. Storage medium 1200 may comprise an article of manufacture. In some examples, storage medium 1200 may include any non-transitory computer readable medium or machine readable medium, such as an optical, magnetic or semiconductor storage. Storage medium 1200 may store various types of computer executable instructions, such as instructions to implement logic flow 1000 or logic flow 1100. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 13:
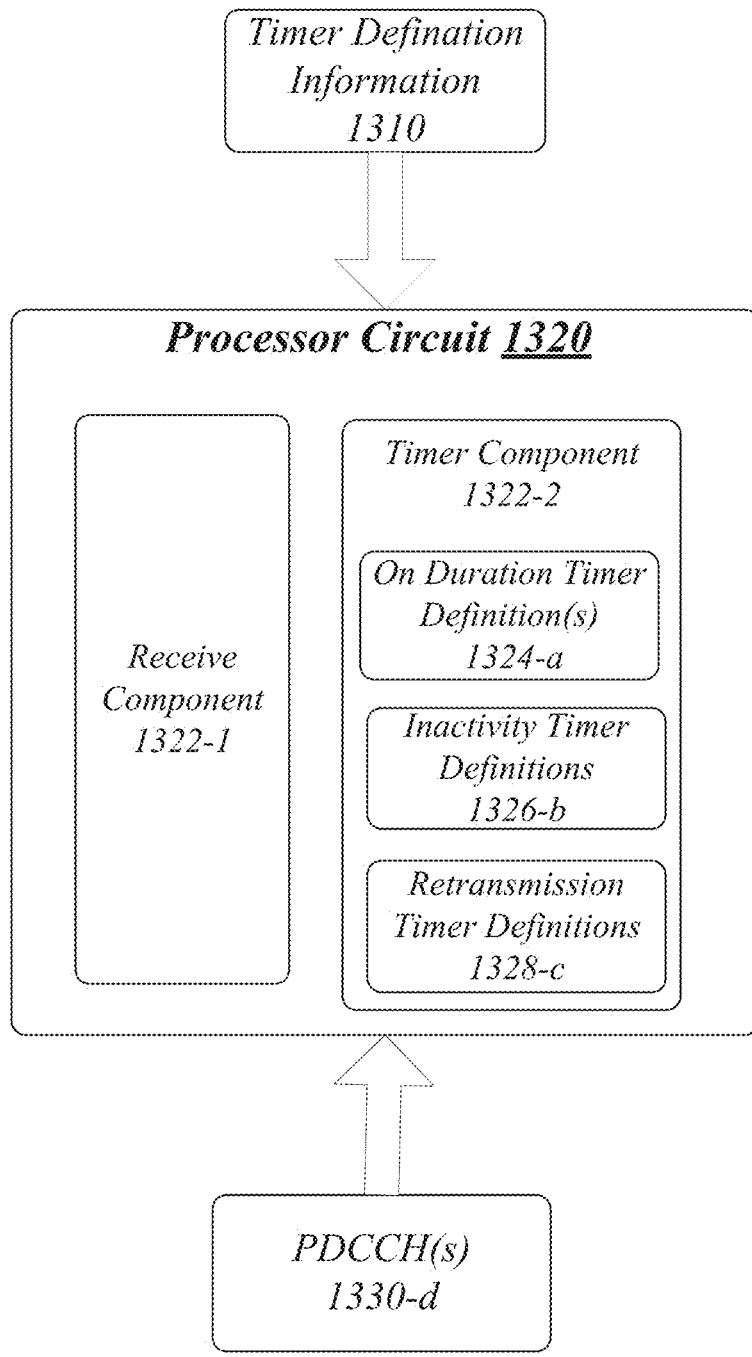
FIG. 13 illustrates an example block diagram for a second apparatus.

FIG. 13 illustrates an example block diagram for a second apparatus. As shown in FIG. 13, the second apparatus includes an apparatus 1300. Although apparatus 1300 shown in FIG. 13 has a limited number of elements in a certain topology or configuration, it may be appreciated that apparatus 1300 may include more or less elements in alternate configurations as desired for a given implementation.

The apparatus 1300 may comprise a computer-implemented apparatus 1300 having a processor circuit 1320 arranged to execute one or more software components 1322-a. Similar to apparatus 900 for FIG. 9, "a" and "b" and "c" and similar designators may be variables representing any positive integer. The processor circuit 1320 can be any of various commercially available processors to include, but not limited to, those previously mentioned for processing circuit 920 for apparatus 900. Dual microprocessors, multi-core processors, and other multi-processor architectures may also be employed as processor circuit 1320.

According to some examples, apparatus 1300 may be part of a wireless device or UE arranged to operate in compliance with one or more wireless broadband technologies such as those described in the 3GPP LTE Specifications. For example, apparatus 1300 may be arranged or configured to communicatively couple to an LTE and/or LTE-A compliant wireless network. The examples are not limited in this context.

According to some examples, apparatus 1300 may include a receive component 1322-1. Receive component 1322-1 may be arranged for execution by processor circuit 1320 to receive timer definition information 1310. For these examples, timer definition information 1310 may include a first and second set of timers associated with powering receiver circuitry arranged to receive data from first and second serving cells using respective first and second TDD configurations.

In some examples, apparatus 1300 may also include a timer component 1322-2. Timer component 1322-2 may be arranged for execution by processor circuit 1320 to at least temporarily maintain definitions for the first and second sets of timers (e.g., stored in a data structure such as a lookup table (LUT) or in a dedicated portion of persistent memory) included in timer definition information 1310. For these examples, the definitions may include on duration timer definition(s) 1324-a, inactivity timer definitions 1326-b or retransmission timer definitions 1228-c.

According to some examples, as mentioned above for FIGS. 4-8, depending on the definitions, responsive to receiving data such as PDCCH(s) 1330-d from a given serving cell, timer component 1322-2 may be configured to selectively power on or off receiver circuitry at a wireless device or UE. For example, responsive to a PDCCH subframe from a primary serving cell, the wireless device or UE may start an on duration timer to maintain power to the receiver circuitry. For other examples, responsive to receiving a PDCCH subframe from a scheduling serving cell, the wireless device or UE may start either a retransmission timer to maintain power or start an inactivity timer that may allow the UE to eventually power off the receiver circuitry.

Various components of apparatus 1300 and a device implementing apparatus 1300 may be communicatively coupled to each other by various types of communications media to coordinate operations. The coordination may involve the unidirectional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

FIG. 14 illustrates an example of a third logic flow. As shown in FIG. 14, the third logic flow includes a logic flow 1400. Logic flow 1400 may be representative of some or all of the operations executed by one or more logic, features, or devices described herein, such as apparatus 1300. More particularly, logic flow 1400 may be implemented by receive component 1322-1 or timer component 1322-2.

In the illustrated example shown in FIG. 14, logic flow 1400 at block 1402 may receive a first set of timers associated with powering circuitry arranged to receive data from a first serving cell using a first TDD configuration. For example, apparatus 1300 may be part of a wireless device such as UE 105. For these examples, receive component 1322-1 may receive the first set of timers from a serving cell such as PCell 100 arranged to communicate with UE 105 using configuration 3 as depicted in TDD configuration table 300 in FIG. 3. The first set of timers may include one or more of on duration, retransmission or inactivity timers.

According to some examples, logic flow 1400 at block 1404 may receive a second set of timers associated with powering circuitry arranged to receive data from a second serving cell using a second TDD configuration. For these examples, receive component 1322-1 may receive the second set of timers a serving cell such as SCell 120 arranged to communicate with UE 105 using configuration 5 as depicted in TDD configuration table 300 in FIG. 3. The second set of timers may include one or more of on duration, retransmission or inactivity timers.

In some examples, logic flow 1400 may receive data from the first serving cell at block 1406. For these examples, UE 105 and BS 111 supporting PCell 110 may be LTE-A compliant elements of wireless network 100 and the data received may be a PDCCH subframe. Logic flow 1400 at block 1408 may then selectively power on or off the receiver circuitry based on the first set of timers.

According to some examples, logic flow 1400 may receive data from the second serving cell at block 1410. For these examples, BS 111 may also be configured or arranged to support SCell 120. Logic flow 1400 at block 1412 may then selectively power on or off the receiver circuitry based on the second set of timers.

Figure 15:
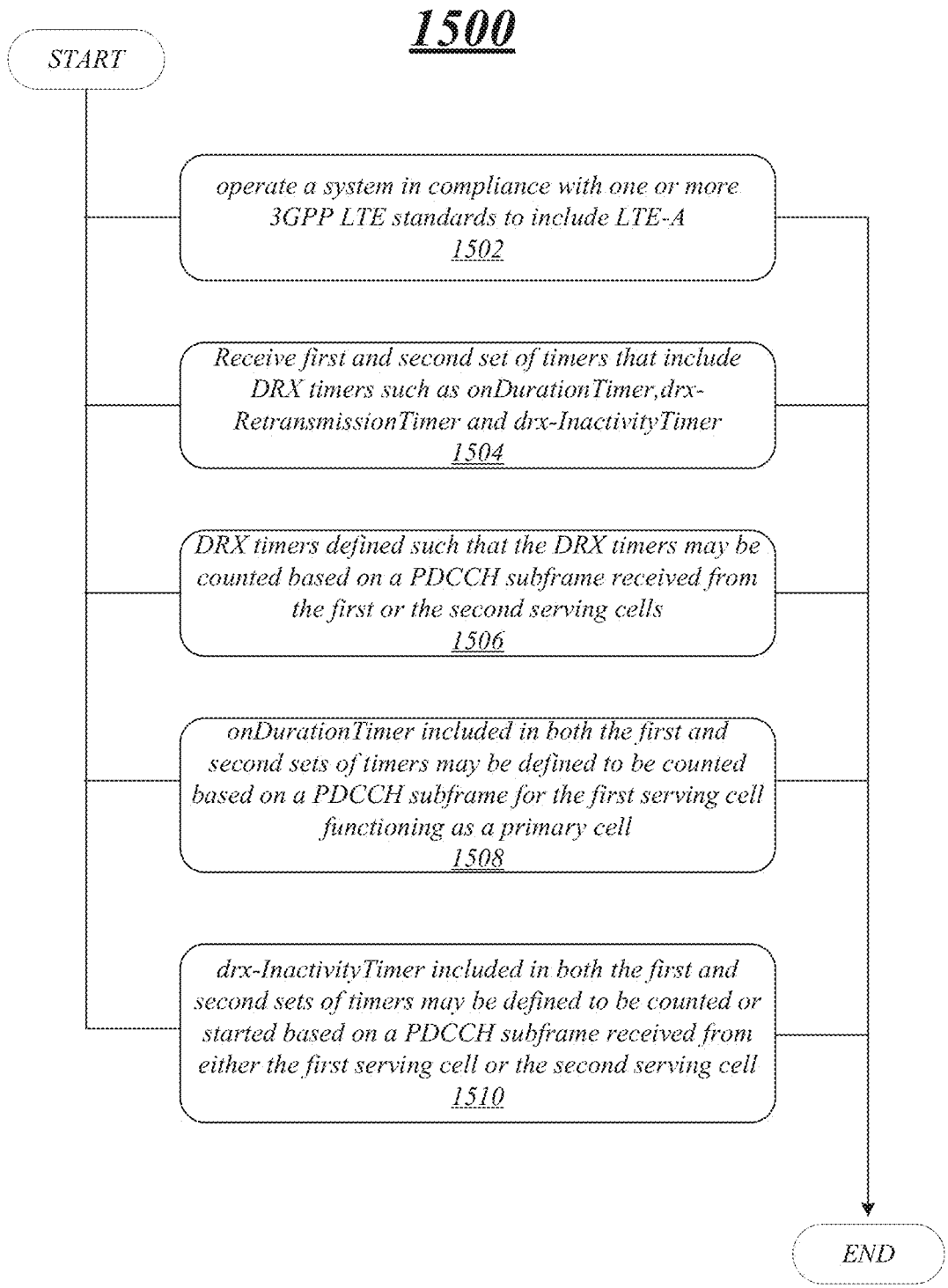
FIG. 15 illustrates an example of a fourth logic flow.

FIG. 15 illustrates an example of a fourth logic flow. As shown in FIG. 15, the fourth logic flow includes a logic flow 1500. The logic flow 1500 may be representative of some or all of the operations executed by one or more logic, features, or devices described herein, such as the apparatus 1300. More particularly, the logic flow 1500 may be implemented by receive component 1322-1 or timer component 1322-2.

In the illustrated example shown in FIG. 15, logic flow 1500 may be implemented by a system in compliance with one or more 3GPP LTE standards or specifications to include specifications associated with LTE-A at block 1502. For example, elements of wireless network 100 such as UE 105 may be arranged to operate in compliance with one or more specifications associated with LTE-A.

According to some examples, logic flow 1500 at block 1504 may receive first and second sets of timers from the first and second serving cells at block 1504. For these examples, the first and second sets of timers may include DRX timers such as on DurationTimer, drx-RetransmissionTimer or drx-InactivityTimer.

In some examples, logic flow 1500 at block 1506 may define the DRX timers such that the DRX timers may be counted based on a PDDCH subframe received from the first or second serving cells. For example, an on DurationTimer, a drx-RetransmissionTimer or a drx-InactivityTimer may be counted based on a PDDCH subframe received from PCell 110 or SCell 120.

According to some examples, logic flow 1500 at block 1508 may define the on DurationTimer included in both the first and second sets of timers to be counted based on a PDCCH subframe for the first serving cell functioning as a primary cell. For these examples, similar to what was mentioned above for FIG. 7, a PDCCH subframe for PCell 110 may trigger the on DurationTimer at UE 105. Thus, whether using configurations 3 or 5 from TDD configuration table 300, the on DurationTimer is counted based on the PDCCH subframe for PCell 110.

In some examples, logic flow 1500 at block 1510 may define drx-InactivityTimer such that a PDCCH subframe received from either the first serving cell or the second serving cell causes the drx-InactivityTimer to be counted or triggered. For example, similar to what was mentioned above for FIG. 8, PDCCH subframes received from PCell 110 or PCell 120 for purposes of scheduling the exchange of data with UE 105 may trigger a drx-InactivityTimer included in either the first or second sets of timers. Logic flow 1500 may then come to an end.

FIG. 16 illustrates an embodiment of a second storage medium. As shown in FIG. 16, the second storage medium includes a storage medium 1600. Storage medium 1600 may comprise an article of manufacture. In some examples, storage medium 1600 may include any non-transitory computer readable medium or machine readable medium, such as an optical, magnetic or semiconductor storage. Storage medium 1600 may store various types of computer executable instructions, such as instructions to implement logic flow 1400 or logic flow 1500. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 17:
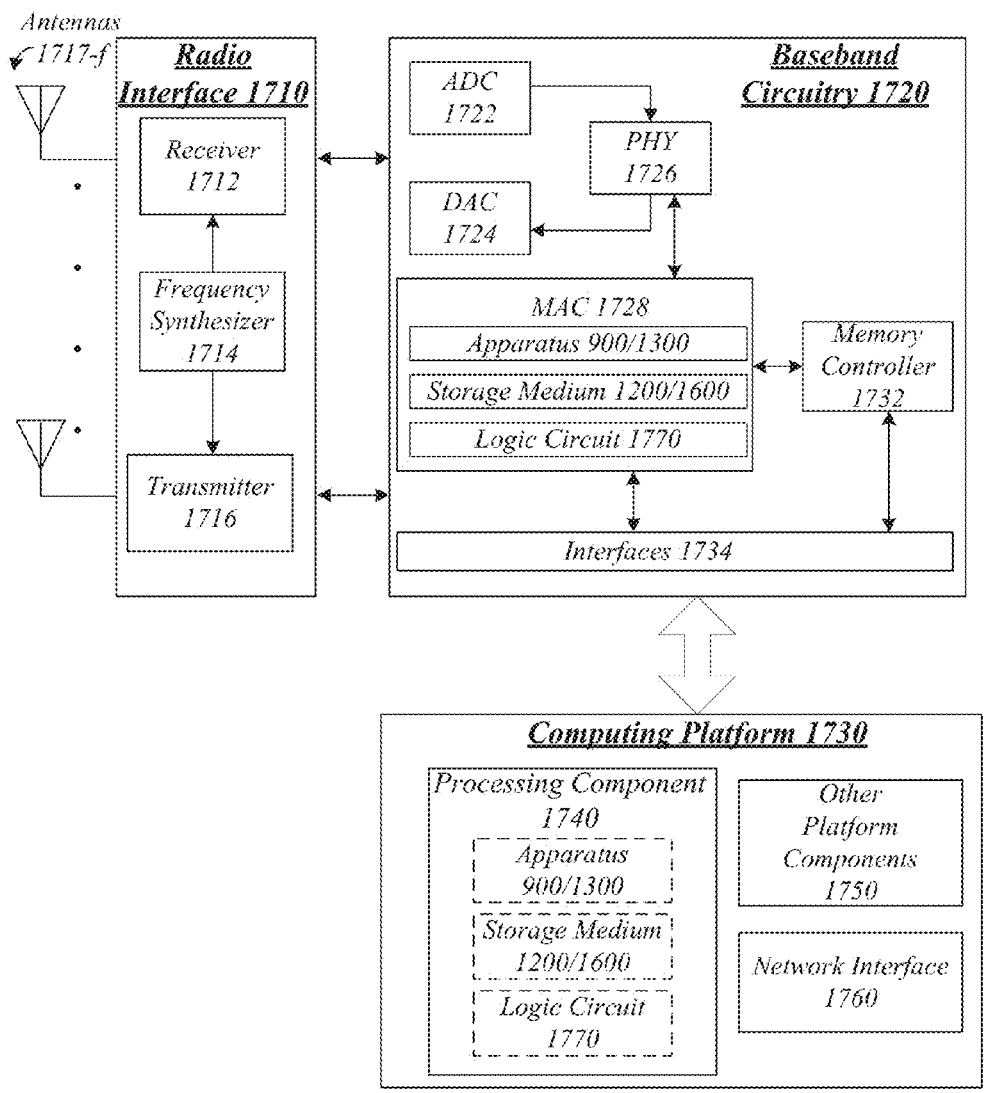
FIG. 17 illustrates an example of a device.

FIG. 17 illustrates an embodiment of a device 1700 for use in a broadband wireless access network. Device 1700 may implement, for example, apparatus 900 or 1300, storage medium 1200 or 1600 and/or a logic circuit 1770. The logic circuit 1770 may include physical circuits to perform operations described for apparatus 900 or apparatus 1300. As shown in FIG. 17, device 1700 may include a radio interface 1710, baseband circuitry 1720, and computing platform 1730, although examples are not limited to this configuration.

The device 1700 may implement some or all of the structure and/or operations for apparatus 900 or 1300, storage medium 1200 or 1600 and/or logic circuit 1770 in a single computing entity, such as entirely within a single device. Alternatively, the device 1700 may distribute portions of the structure and/or operations for apparatus 900 or 1300, storage medium 1200 or 1600 and/or logic circuit 1770 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The examples are not limited in this context.

In some examples, radio interface 1710 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1710 may include, for example, a receiver 1712, a transmitter 1716 and/or a frequency synthesizer 1714. Radio interface 1710 may include bias controls, a crystal oscillator and/or one or more antennas 1718-f. In another embodiment, radio interface 1710 may use external voltage-controlled oscillators (VCOs), surface acoustic wave filters, intermediate frequency (IF) filters and/or RF filters, as desired. Due to the variety of potential RF interface designs an expansive description thereof is omitted.

According to some examples, device 1700 may be implemented in a wireless device or UE. For these examples, the components or combination of components adapted for receiving signals may include receiver circuitry that may be selectively powered on or off based on one or more timers defined as mentioned previously for FIGS. 1-16.

Baseband circuitry 1720 may communicate with radio interface 1710 to process receive and/or transmit signals and may include, for example, an analog-to-digital converter 1722 for down converting received signals, a digital-to-analog converter 1724 for up converting signals for transmission. Further, baseband circuitry 1720 may include a baseband or physical layer (PHY) processing circuit 1726 for PHY link layer processing of respective receive/transmit signals. Baseband circuitry 1720 may include, for example, a processing circuit 1728 for medium access control (MAC)/data link layer processing. Baseband circuitry 1720 may include a memory controller 1732 for communicating with MAC processing circuit 1728 and/or a computing platform 1730, for example, via one or more interfaces 1734.

In some embodiments, PHY processing circuit 1726 may include a frame construction and/or detection module, in combination with additional circuitry such as a buffer memory, to construct and/or deconstruct communication frames (e.g., containing subframes). Alternatively or in addition, MAC processing circuit 1728 may share processing for certain of these functions or perform these processes independent of PHY processing circuit 1726. In some embodiments, MAC and PHY processing may be integrated into a single circuit.

Computing platform 1730 may provide computing functionality for device 1700. As shown, computing platform 1730 may include a processing component 1740. In addition to, or alternatively of, baseband circuitry 1720 of device 1700 may execute processing operations or logic for apparatus 900 or apparatus 1300, storage medium 1200 or storage medium 1600, and logic circuit 1770 using the processing component 1730. Processing component 1740 (and/or PHY 1726 and/or MAC 1728) may comprise various hardware elements, software elements, or a combination of both. Examples of hardware elements may include devices, logic devices, components, processors, microprocessors, circuits, processor circuits (e.g., processor circuit 720), circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

Computing platform 1730 may further include other platform components 1750. Other platform components 1750 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Computing platform 1730 may further include a network interface 1760. In some examples, network interface 1760 may include logic and/or features to support network interfaces operated in compliance with one or more wireless broadband technologies such as those described in one or more 3GPP LTE or LTE-A specifications or standards Device 1700 may be, for example, user equipment, a computer, a personal computer (PC), a desktop computer, a laptop computer, a notebook computer, a netbook computer, a server, a server array or server farm, a web server, a network server, an Internet server, a work station, a mini-computer, a main frame computer, a supercomputer, a network appliance, a web appliance, a distributed computing system, multiprocessor systems, processor-based systems, wireless access point, base station, node B, subscriber station, mobile subscriber center, radio network controller, router, hub, gateway, bridge, switch, machine, or combination thereof. Accordingly, functions and/or specific configurations of device 1700 described herein, may be included or omitted in various embodiments of device 1700, as suitably desired. In some embodiments, device 1700 may be configured to be compatible with protocols and frequencies associated one or more of the 3GPP LTE Specifications and/or IEEE 802.16 Standards for WWANs and/or other broadband wireless networks, cited herein, although the examples are not limited in this respect.

Embodiments of device 1700 may be implemented using single input single output (SISO) architectures. However, certain implementations may include multiple antennas (e.g., antennas 1718-*f*) for transmission and/or reception using adaptive antenna techniques for beamforming or spatial division multiple access (SDMA) and/or using multiple input multiple output (MIMO) communication techniques.

The components and features of device 1700 may be implemented using any combination of discrete circuitry, application specific integrated circuits (ASICs), logic gates and/or single chip architectures. Further, the features of device 1700 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1700 shown in the block diagram of FIG. 17 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 18:
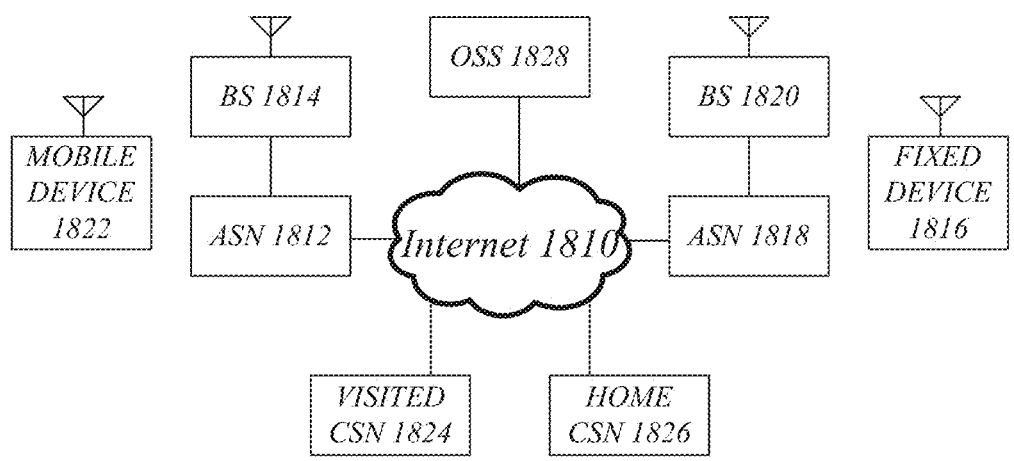
FIG. 18 illustrates an example of a broadband wireless access system.

FIG. 18 illustrates an embodiment of a broadband wireless access system 1800. As shown in FIG. 18, broadband wireless access system 1800 may be an internet protocol (IP) type network comprising an internet 1810 type network or the like that is capable of supporting mobile wireless access and/or fixed wireless access to internet 1810. In one or more embodiments, broadband wireless access system 1800 may comprise any type of orthogonal frequency division multiple access (OFDMA) based wireless network, such as a system compliant with one or more of the 3GPP LTE Specifications and/or IEEE 802.16 Standards, and the scope of the claimed subject matter is not limited in these respects.

In the exemplary broadband wireless access system 1800, access service networks (ASN) 1814, 1818 are capable of coupling with base stations (BS) 1814, 1820 (or eNBs), respectively, to provide wireless communication between one or more fixed devices 1816 and internet 1810, or one or more mobile devices 1822 and Internet 1810. One example of a fixed device 1816 and a mobile device 1822 is UE 105, with the fixed device 1816 comprising a stationary version of UE 105 and the mobile device 1822 comprising a mobile version of UE 105. ASN 1812 may implement profiles that are capable of defining the mapping of network functions to one or more physical entities on broadband wireless access system 1800. Base stations 1814, 1820 (or eNBs) may comprise radio equipment to provide RF communication with fixed device 1816 and mobile device 1822, such as described with reference to device 1800, and may comprise, for example, the PHY, MAC, RLC or PDCP layer equipment in compliance with a 3GPP LTE Specification or an IEEE 802.16 Standard. Base stations 1814, 1820 (or eNBs) may further comprise an IP backplane to couple to Internet 1810 via ASN 1812, 1818, respectively, although the scope of the claimed subject matter is not limited in these respects.

Broadband wireless access system 1800 may further comprise a visited connectivity service network (CSN) 1824 capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VoIP) gateways, and/or internet protocol (IP) type server functions, or the like. However, these are merely example of the types of functions that are capable of being provided by visited CSN 1824 or home CSN 1826, and the scope of the claimed subject matter is not limited in these respects. Visited CSN 1824 may be referred to as a visited CSN in the case where visited CSN 1824 is not part of the regular service provider of fixed device 1816 or mobile device 1822, for example where fixed 1816 or mobile device 1822 is roaming away from their respective home CSN 1826, or where broadband wireless access system 1800 is part of the regular service provider of fixed device 1816 or mobile device 1822 but where broadband wireless access system 1800 may be in another location or state that is not the main or home location of fixed device 1816 or mobile device 1822.

Fixed device 1816 may be located anywhere within range of one or both base stations 1814, 1820, such as in or near a home or business to provide home or business customer broadband access to Internet 1810 via base stations 1814, 1820 and ASN 1812, 1818, respectively, and home CSN 1826. It is worthy to note that although fixed device 1816 is generally disposed in a stationary location, it may be moved to different locations as needed. Mobile device 1822 may be utilized at one or more locations if mobile device 1822 is within range of one or both base stations 1814, 1820, for example.

In accordance with one or more embodiments, operation support system (OSS) 1828 may be part of broadband wireless access system 1800 to provide management functions for broadband wireless access system 1800 and to provide interfaces between functional entities of broadband wireless access system 1800. Broadband wireless access system 1800 of FIG. 18 is merely one type of wireless network showing a certain number of the components of broadband wireless access system 1800, and the scope of the claimed subject matter is not limited in these respects.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

In some examples, first computer-implemented methods may include establishing, at a base station supporting a serving cell for a UE, a first TDD configuration associated with communications to the wireless device. TDD configuration information may then be received from one or more other serving cells indicating at least one of the one or more other serving cells has established a second TDD configuration associated with communications to the UE that is different than the first TDD configuration. For these examples, one or more timers associated with temporarily powering on or off receiver circuitry at the UE may be defined based on the first and second TDD configurations. Information indicating definitions for the one or more timers may then be transmitted to the UE.

According to some examples, the first computer-implemented methods may also include the one or more timers having an on duration timer, an inactivity timer or a retransmission timer. A first definition for the inactivity timer may be based on the first TDD configuration and a second definition for the inactivity timer may be based on the second TDD configuration. Also, a first definition for the retransmission timer may be based on the first TDD configuration and a second definition for the retransmission timer may be based on the second TDD configuration.

In some examples, the first computer-implemented methods may also include the on duration timer having the same definition for both the first and the second TDD configurations.

According to some examples, the first computer-implemented methods may also include the first definition including the inactivity timer starting for a period of time based on the UE receiving data at a downlink subframe for the first TDD configuration from a serving cell associated with scheduling data to be received at the UE. The second definition may include starting the inactivity timer for the period of time based on the UE receiving data at a downlink subframe for the second TDD configuration from the serving cell associated with scheduling data to be received at the UE.

In some examples, the first computer-implemented methods may also include the first TDD configuration established based on the serving cell communicatively coupling to the UE via a first frequency band. For these examples, the second TDD configuration may be established based on the one or more other serving cells communicatively coupled to the UE via a second frequency band.

According to some examples, for the first computer-implemented methods, defining the one or more timers based on the first and second TDD configurations may include defining a first set of timers based on the first TDD configuration and defining a second set of timers based on the second TDD configuration. For these examples, the first set of timers and the second set of timers may separately include an on duration timer, an inactivity timer or a retransmission timer. The definitions for the timers included in the first set of timers may be different than the definitions for the timers included in the second set of timers.

In some examples, the first computer-implemented methods may also include the first set of timers common for serving cells communicating with the UE via a first frequency band and the second set of timers common for serving cells communicating with the UE via a second frequency band that is different from the first frequency band.

In some examples, the first computer-implemented methods may also include defining the one or more timers based on the UE being configured to operate in a half-duplex mode. For these examples, the UE may be configured so that downlink operations are allowed where downlink/uplink subframes are different between the first and second TDD configurations. The one more timers may be defined such that the one or more timers may be started based both on downlink subframes matching between the first and second TDD configurations and on downlink/uplink subframes being different between the first and second TDD configurations for a given subframe.

According to some examples, the first computer-implemented methods may also include defining the one or more timers based on the UE being configured to operate in a half-duplex mode. For these examples, the UE may be configured so that uplink operations are allowed where downlink/uplink subframes are different between the first and second TDD configurations. The one or more timers may be defined such that the one or more timers may be started based on downlink subframes matching between the first and second TDD configurations for a given subframe.

In some examples, the first computer-implemented methods may also include defining the one or more timers based on the UE being configured to operate in a half-duplex mode. For these examples, the UE may be configured so that an uplink or a downlink operation is dynamically allowed where downlink/uplink subframes are different between the first and second TDD configurations. The one or more timers may be defined such that the one or more timers may be started based on downlink subframes that match between the first and second TDD configurations for a given subframe.

According to some examples, the first computer-implemented methods may also include the one or more timers to be defined such that the one or more timers may be started based both on downlink subframes matching between the first and second TDD configurations and when downlink/uplink subframes are different between the first and second TDD configurations for a given subframe.

In some examples, the first computer-implemented methods may also include the one or more timers defined such that the one or more timers may be started based on downlink subframes are the same between the first and second TDD configurations for a given subframe.

According to some examples, the first computer-implemented methods may also include the base station configured as an eNBs operating in compliance with one or more or more 3GPP LTE standards to include LTE-A. For these examples, the one or more timers associated with temporarily powering off receiver circuitry at the UE may include discontinuous reception (DRX) timers such as an on DurationTimer, a drx-RetransmissionTimer and a drx-InactivityTimer. The DRX timers may be defined such that at least some of the DRX timers are counted at the UE based on a PDCCH subframe received by the UE.

In some examples, for the first computer-implemented methods, the serving cell supported by the base station configured to function as a primary cell serving the UE. For these examples, the on DurationTimer may be defined such that the on DurationTimer is counted based on a PDCCH subframe for the primary cell.

According to some examples, the first computer-implemented methods may also include the drx-RetransmissionTimer or the drx-InactivityTimer defined such that the drx-InactivityTimer or the drx-RetransmissionTimer are counted responsive to receiving a PDCCH subframe at the UE from a scheduling serving cell. The scheduling serving cell to be from among the one or more other serving cells or the scheduling serving cell to be the primary cell.

In some examples, for the first computer-implemented methods, defining the DRX timers based on the first and second TDD configurations may include defining a first set of DRX timers based on the first TDD configuration. The first set of DRX timers may be common to serving cells associated with a first timing advanced group communicating with the UE via a first frequency band. The second set of DRX timers may be defined based on the second TDD configuration. The second set of DRX timers may be common to serving cells associated with a second timing advanced group communicating with the UE via a second frequency band.

According to some examples, at least one machine readable medium comprising a plurality of instructions that in response to being executed on a computing device cause the computing device to carry out the example first computer-implemented methods as mentioned above.

In some examples a communications device may be arranged to perform the example first computer-implemented methods as mentioned above.

In some examples an apparatus or device may include means for performing the example first computer-implemented methods as mentioned above.

In some examples, second computer-implemented methods may include receiving a first set of timers associated with powering receiver circuitry arranged to receive data from a first serving cell using a first TDD configuration and receiving a second set of timers associated with powering receiver circuitry arranged to receive data from a second serving cell using a second TDD configuration. For these examples, responsive to receiving data from the first serving cell, the receiver circuitry may be selectively powered on or off based on the first set of timers. Also, responsive to receiving data from the second serving cell, the receiver circuitry may be selectively powered on or off based on the second set of timers.

According to some examples, the second computer-implemented methods may also include the first serving cell using the first TDD configuration communicatively coupled to the UE via a first frequency band. The second serving cell using the second TDD configuration communicatively coupled to the UE via a second frequency band.

In some examples, the second computer-implemented methods may also include the first and second set of timers separately including an on duration timer, an inactivity timer and a retransmission timer. Definitions for timers included in the first set of timers may be different than definitions for timers included in the second set of timers.

According to some examples, the second computer-implemented methods may also include a system to implement the second computer-implemented methods. The system may be configured to operate in compliance with one or more or more 3GPP LTE standards to include LTE-A. For these examples, the first and second sets of timers may include discontinuous reception (DRX) timers such as an on DurationTimer, a drx-RetransmissionTimer and a drx-InactivityTimer. The DRX timers may be defined such that the DRX timers are counted based on a PDCCH subframe received from the first or second serving cells.

In some examples, for the second computer-implemented methods, the on DurationTimer included in both the first and second sets of timers may be defined to be counted based on a PDCCH subframe a serving cell from among the first and second serving cells arranged to function as a primary serving cell for the UE.

According to some examples, for the second computer-implemented methods, the drx-InactivityTimer included in both the first and second sets of timers may be defined to be counted based on a PDCCH subframe received from either the first serving cell or the second serving cell.

According to some examples, at least one machine readable medium comprising a plurality of instructions that in response to being executed on a computing device cause the computing device to carry out the example second computer-implemented methods as mentioned above.

In some examples a communications device may be arranged to perform the example second computer-implemented methods as mentioned above.

In some examples an apparatus or device may include means for performing the example second computer-implemented methods as mentioned above.

According to some examples, an example apparatus may include a processor circuit for a base station arranged to support a first serving cell for a UE. The example apparatus may also include a configuration component arranged for execution by the processor circuit to establish a first TDD configuration for communicatively coupling to the UE via the first serving cell. The example apparatus may also include a receive component arranged for execution by the processor circuit to receive TDD configuration information a second serving cell that indicates the second serving cell has established a second TDD configuration for communicatively coupling to the UE that is different than the first TDD configuration. The example apparatus may also include a timer component arranged for execution by the processor circuit to define one or more timers associated with temporarily powering on or off receiver circuitry at the UE based on the first and second TDD configurations.

According to some examples, the example apparatus may also include a radio interface communicatively coupled to the processor circuit to communicate information to the UE. The information may indicate the definitions for the one or more timers.

In some examples for the example apparatus, defining the one or more timers based on the first and the second TDD configurations may include the timer component arranged to define separate sets of timers. Definition of the separate sets of timers may include a first set of timers defined based on the first TDD configuration and a second set of timers defined based on the second TDD configuration.

According to some examples for the example apparatus, the first set of timers and the second set of timers may separately include an on duration timer, an inactivity timer or a retransmission timer. Definitions for the timers defined by the timer component for the first set of timers may be different than definitions for the timers defined by the timer component for the second set of timers.

In some examples for the example apparatus, the base station may be arranged to operate as an eNB in compliance with one or more or more 3GPP LTE standards to include LTE-A. For these examples, the one or more timers associated with temporarily powering off receiver circuitry at the UE may include discontinuous reception (DRX) timers. The DRX timers may include an on DurationTimer, a drx-RetransmissionTimer and a drx-InactivityTimer. The DRX timers may be defined such that the DRX timers are counted at the UE based on a PDCCH subframe received by the UE.

According to some examples for the example apparatus, the timer component may be arranged to define the DRX timers to be counted based on a PDCCH subframe for the first serving cell. The first serving cell may be arranged to function as a primary serving cell for the UE.

In some examples for the example apparatus, the timer component may be arranged to define the DRX timers such that at least some of the DRX timers are counted responsive to receipt of a PDCCH subframe from either the first or second serving cells.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
   establishing, at an evolved node B (eNB) configured to support a serving cell for user equipment and arranged to operate in compliance with one or more $3^{rd}$ Generation Partnership Project (3GPP) Long Term Evolution (LTE) standards to include LTE-Advanced (LTE-A), a first time division duplex (TDD) configuration associated with communications to the user equipment;
   receiving TDD configuration information for one or more other serving cells indicating at least one of the one or more other serving cells has established a second TDD configuration associated with communications to the user equipment that is different from the first TDD configuration;
   defining one or more discontinuous reception (DRX) timers associated with temporarily powering on or off receiver circuitry at the user equipment based on the first and second TDD configurations, the one or more DRX timers comprising a drx-InactivityTimer; and
   defining a first definition for the drx-InactivityTimer based on the first TDD configuration and a second definition for the drx-InactivityTimer based on the second TDD configuration.

2. The computer-implemented method of claim 1, the one or more DRX timers comprising an onDurationTimer and a drx-RetransmissionTimer.

3. The computer-implemented method of claim 2, comprising defining a first definition for the drx-RetransmissionTimer based on the first TDD configuration and defining a second definition for the drx-RetransmissionTimer based on the second TDD configuration.

4. The computer-implemented method of claim 2, the onDurationTimer having the same definition for both the first and the second TDD configurations.

5. The computer-implemented method of claim 1, comprising defining the one or more DRX timers such that at least some of the one or more DRX timers are counted at the wireless device based on a physical downlink control channel (PDCCH) subframe received by the user equipment.

6. The computer-implemented method of claim 2, comprising:
   configuring the serving cell supported by the eNB to function as a primary cell serving the user equipment; and
   defining the onDurationTimer such that the onDurationTimer is counted based on a physical downlink control channel (PDCCH) subframe for the primary cell.

7. The computer-implemented method of claim 6, comprising defining the drx-RetransmissionTimer such that the drx-RetransmissionTimer is counted responsive to receiving a PDCCH subframe at the user equipment from a scheduling serving cell, the scheduling serving cell from among the one or more other serving cells or the scheduling serving cell to be the primary cell.

8. The computer-implemented method of claim 1, defining the one or more DRX timers based on the first and second TDD configurations comprising:
   defining a first set of DRX timers based on the first TDD configuration, the first set of DRX timers common to serving cells associated with a first timing advanced group (TAG) communicating with the user equipment via a first frequency band; and
   defining a second set of DRX timers based on the second TDD configuration, the second set of DRX timers common to serving cells associated with a second TAG communicating with the user equipment via a second frequency band.

9. The computer-implemented method of claim 1, comprising defining the one or more DRX timers based on the user equipment being configured to operate in a half-duplex mode.

10. The computer-implemented method of claim 9, the user equipment configured so that downlink operations are allowed where downlink/uplink subframes are different between the first and second TDD configurations, the one or more DRX timers defined such that the one or more DRX timers may be started based both on downlink subframes matching between the first and second TDD configurations and on downlink/uplink subframes that are different between the first and second TDD configurations for a given subframe.

11. The computer-implemented method of claim 9, the user equipment configured so that uplink operations are allowed where downlink/uplink subframes are different between the first and second TDD configurations, the one or more DRX timers defined such that the one or more DRX timers may be started based on downlink subframes matching between the first and second TDD configurations for a given subframe.

12. The computer-implemented method of claim 9, the user equipment configured so that an uplink or a downlink operation is dynamically allowed where downlink/uplink subframes are different between the first and second TDD configurations, the one or more DRX timers defined such that the one or more DRX timers may be started based on downlink subframes that match between the first and second TDD configurations for a given subframe.

13. The computer-implemented method of claim 1, comprising defining the one or more DRX timers such that the one or more DRX timers may be started based both on downlink subframes matching between the first and second TDD configurations and on downlink/uplink subframes being different between the first and second TDD configurations for a given subframe.

14. The computer-implemented method of claim 1, comprising defining the one or more DRX timers such that the one or more DRX timers may be started based on downlink subframes that are the same between the first and second TDD configurations for a given subframe.

15. An apparatus comprising:
   a processor circuit for a an evolved node B (eNB) arranged to support a first serving cell for user equipment and arranged to operate in compliance with one or more $3^{rd}$ Generation Partnership Project (3GPP) Long Term Evolution (LTE) standards to include LTE-Advanced (LTE-A);

a configuration component arranged for execution by the processor circuit to establish a first time division duplex (TDD) configuration for communicatively coupling to the user equipment via the first serving cell;

a receive component arranged for execution by the processor circuit to receive TDD configuration information for a second serving cell that indicates the second serving cell has established a second TDD configuration for communicatively coupling to the user equipment that is different than the first TDD configuration; and a timer component arranged for execution by the processor circuit to define one or more discontinuous reception (DRX) timers associated with temporarily powering on or off receiver circuitry at the user equipment based on the first and second TDD configurations, the timer component arranged to define separate sets of DRX timers to include a first set of DRX timers based on the first TDD configuration and a second set of DRX timers based on the second TDD configuration.

16. The apparatus of claim 15, comprising a radio interface communicatively coupled to the processor circuit to communicate information to the user equipment, the information to indicate the definitions for the one or more DRX timers.

17. The apparatus of 15, the first set of DRX timers and the second set of DRX timers to separately include an onDurationTimer, a drx-RetransmissionTimer and a drx-InactivityTimer, definitions for the DRX timers defined by the timer component for the first set of DRX timers being different than definitions for the DRX timers defined by the timer component for the second set of DRX timers.

18. The apparatus of claim 15, the timer component arranged to define the DRX timers such that the DRX timers are counted at the user equipment based on a physical downlink control channel (PDCCH) subframe received by the user equipment.

19. The apparatus of claim 15, the timer component arranged to define the DRX timers to be counted based on a physical downlink control channel (PDCCH) subframe for the first serving cell, the first serving cell arranged to function as a primary serving cell for the user equipment.

20. The apparatus of claim 15, the timer component arranged to define the DRX timers such that at least some of the DRX timers are counted responsive to receipt of a physical downlink control channel (PDCCH) subframe from either the first or second serving cells.

21. The apparatus of claim 15, comprising a digital display coupled to the processor circuit to present a user interface view.

22. At least one machine readable medium comprising a plurality of instructions that in response to being executed on a system for user equipment configured to operate in compliance with one or more or more $3^{rd}$ Generation Partnership Project (3GPP) Long Term Evolution (LTE) standards to include LTE-Advanced (LTE-A) causes the system to:

receive a first set of discontinuous reception (DRX) timers associated with powering receiver circuitry arranged to receive data from a first serving cell using a first time division duplex (TDD) configuration;

receive a second set of DRX timers associated with powering receiver circuitry arranged to receive data from a second serving cell using a second TDD configuration;

responsive to receiving data from the first serving cell, selectively powering on or off the receiver circuitry based on the first set of DRX timers; and responsive to receiving data from the second serving cell, selectively powering on or off the receiver circuitry based on the second set of DRX timers.

23. The at least one machine readable medium of claim 22, comprising the first serving cell using the first TDD configuration communicatively coupled to the user equipment via a first frequency band and the second serving cell using the second TDD configuration communicatively coupled to the user equipment via a second frequency band.

24. The at least one machine readable medium of claim 22, the first and second sets of DRX timers comprises an onDurationTimer, a drx-RetransmissionTimer and a drx-InactivityTimer, the first and second sets of DRX timers to be defined such that the DRX timers are counted based on a physical downlink control channel (PDCCH) subframe received from the first or second serving cells.

25. The at least one machine readable medium of claim 24, comprising the onDurationTimer included in both the first and second sets of DRX timers is defined to be counted based on a PDCCH subframe for a serving cell from among the first and second serving cells arranged to function as a primary serving cell for the user equipment.

26. The at least one machine readable medium of claim 24, comprising the drx-InactivityTimer included in both the first and second sets of DRX timers is defined to be counted based on a PDCCH subframe received from either the first serving cell or the second serving cell.

* * * * *